US007377672B2

(12) United States Patent
Tickner

(10) Patent No.: US 7,377,672 B2
(45) Date of Patent: May 27, 2008

(54) METHOD AND APPARATUS FOR PREVENTING ROTATION OF A LIGHTING DEVICE CHASSIS

(75) Inventor: Jerold Tickner, Aurora, CO (US)

(73) Assignee: Cooper Technologies Company, Houston, TX (US)

(*) Notice: Subject to any disclaimer, the term of this patent is extended or adjusted under 35 U.S.C. 154(b) by 86 days.

(21) Appl. No.: 11/339,270

(22) Filed: Jan. 25, 2006

(65) Prior Publication Data

US 2007/0171659 A1 Jul. 26, 2007

(51) Int. Cl.
*F21V 21/00* (2006.01)
*F21V 21/26* (2006.01)
*B60Q 1/06* (2006.01)

(52) U.S. Cl. ...................... 362/371; 362/372; 362/269; 362/271; 362/285; 362/427; 362/287; 362/428

(58) Field of Classification Search ................ 362/269, 362/271, 285, 427, 371–372, 287, 428
See application file for complete search history.

(56) References Cited

U.S. PATENT DOCUMENTS 3,167,258 A 1/1965 Wilde
3,363,091 A 1/1968 Cooper
3,686,495 A 8/1972 Medley
3,991,905 A 11/1976 Nicpon
4,379,322 A 4/1983 Kelly
4,412,276 A 10/1983 Blinow
4,587,602 A 5/1986 Dean et al.
5,205,633 A 4/1993 Kasboske
5,243,507 A 9/1993 Atkins et al.
6,059,429 A * 5/2000 Bodell ........................ 362/287
6,152,583 A 11/2000 Langner
6,422,709 B1 7/2002 Panagiotou
6,773,135 B1 8/2004 Packer
6,902,303 B2 6/2005 Lee
7,018,070 B2 3/2006 McCoy
2004/0085770 A1 5/2004 Tyler et al.
2005/0047128 A1 3/2005 Monroe et al.
2007/0171643 A1 7/2007 Gaines et al.
2007/0171648 A1 7/2007 Tickner et al.
2007/0171652 A1 7/2007 Gaines et al.
2007/0171653 A1 7/2007 Bingaman et al.
2007/0171657 A1 7/2007 Tickner et al.
2007/0171658 A1 7/2007 Tickner et al.
2007/0171660 A1 7/2007 Wilkinson et al.

OTHER PUBLICATIONS

U.S. Appl. No. 29/252,649, Tickner et al.

* cited by examiner

*Primary Examiner*—Sandra O'Shea
*Assistant Examiner*—Sean P Gramling
(74) *Attorney, Agent, or Firm*—King & Spalding

(57) ABSTRACT

An apparatus and method according to which rotation of a lighting device chassis is prevented.

17 Claims, 24 Drawing Sheets

METHOD AND APPARATUS FOR PREVENTING ROTATION OF A LIGHTING DEVICE CHASSIS

CROSS REFERENCE TO RELATED APPLICATIONS

The present application is related to (1) U.S. Utility application Ser. No. 11/339,387, filed on Jan. 25, 2006, the disclosure which is incorporated herein by reference; (2) U.S. Utility application Ser. No. 11/339,426 , filed on Jan. 25, 2006 the disclosure which is incorporated herein by reference; (3) U.S. Utility application Ser. No. 11/339,271, filed on Jan. 25, 2006, the disclosure which is incorporated herein by reference; (4) U.S. Utility application Ser. No. 11/339,164, filed on Jan. 25, 2006 the disclosure which is incorporated herein by reference; (5) U.S. Utility application Ser. No. 11/339,363, filed on Jan. 25, 2006, the disclosure which is incorporated herein by reference; (6) U.S. Utility application Ser. No. 11/339,028, filed on Jan. 25, 2006, the disclosure which is incorporated herein by reference; (7) U.S. Utility application Ser. No. 11/339,207, filed on Jan. 25, 2006, the disclosure which is incorporated herein by reference; (8) U.S. Design application Ser. No. 29/252,645, filed on Jan. 25, 2006, the disclosure which is incorporated herein by reference; and (9) U.S. Design application Ser. No. 29/252,649, filed on Jan. 25, 2006, the disclosure which is incorporated herein by reference.

BACKGROUND

The present disclosure relates in general to lighting and in particular to a method and apparatus for preventing rotation of a lighting device chassis.

DETAILED DESCRIPTION

Figure 1:
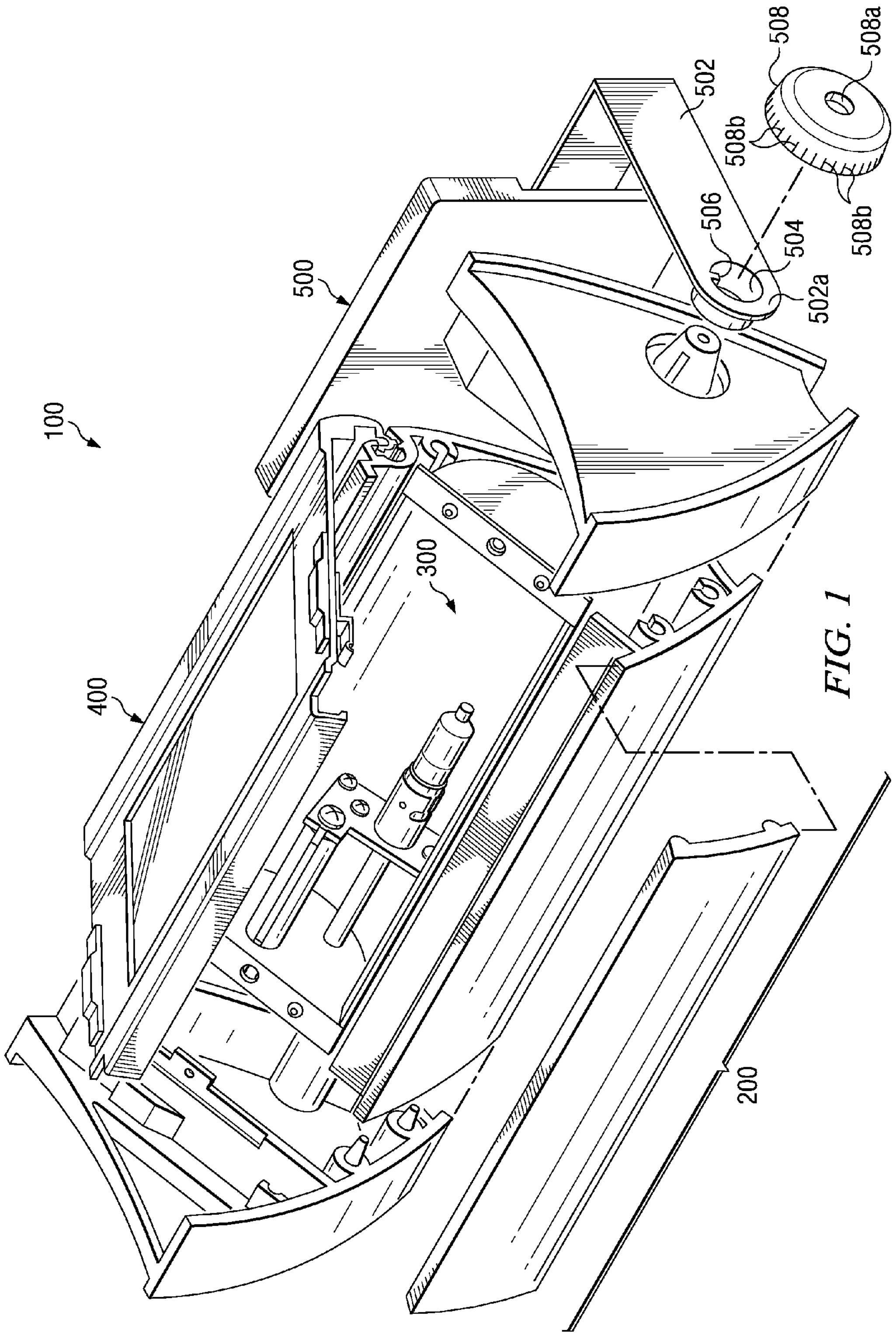
FIG. 1 is an exploded view illustrating an exemplary embodiment of a lighting apparatus.

Referring now to FIG. 1, a lighting apparatus 100 is illustrated. The lighting apparatus 100 includes a lighting device chassis 200 that houses a reflector member 300. A door 400 is coupled to the lighting device chassis 100. The lighting device chassis 100 is coupled to a chassis support member 500.

Referring now to FIGS. 1, 2*a*, 2*b*, and 2*c*, the lighting device chassis 200 is illustrated. The lighting device chassis 200 includes a chassis base 202 having a pair of side walls 204*a* and 204*b* that are coupled together and spaced apart in a substantially V-shaped orientation by a bottom wall 204*c*. A lighting device housing 206 is defined between the side walls 204*a* and 204*b* and the bottom wall 204*c*. A plurality of end cap coupling members 208*a* and 208*b* extend from the side wall 204*a*, along the length of the chassis base 202, and into the lighting device housing 206. A door support 210 extends from the side wall 204*a*, along the length of the chassis base 202, and is located adjacent the end cap coupling member 208*a*. A end cap coupling member 212 extends from the side wall 204*b*, along the length of the chassis base 202, and into the lighting device housing 206. A cable aperture 214 is defined by the side wall 204*b*, located adjacent the end cap coupling member 212, and provides access to the lighting device housing 206 through the side wall 204*b*. A door coupling member 216 is located on the distal end of the side wall 204*b* adjacent the end cap coupling member 212 and along the length of the chassis base 202. The door coupling member 216 defines a semi-circular door coupling channel 216*a* along the length of the chassis base 202. A stop member 216*b* is located adjacent the door coupling channel 216*a* and along the length of the chassis base 202. An L-shaped support beam 216*c* extends above the door coupling channel 216*a*, partially defines the door coupling channel 216*a*, and is located opposite the door coupling channel 216*a* from the stop member 216*b*. In an exemplary embodiment, the chassis base 202 may include a variety of different cross sections that include a door coupling member 216.

Figure 2A:
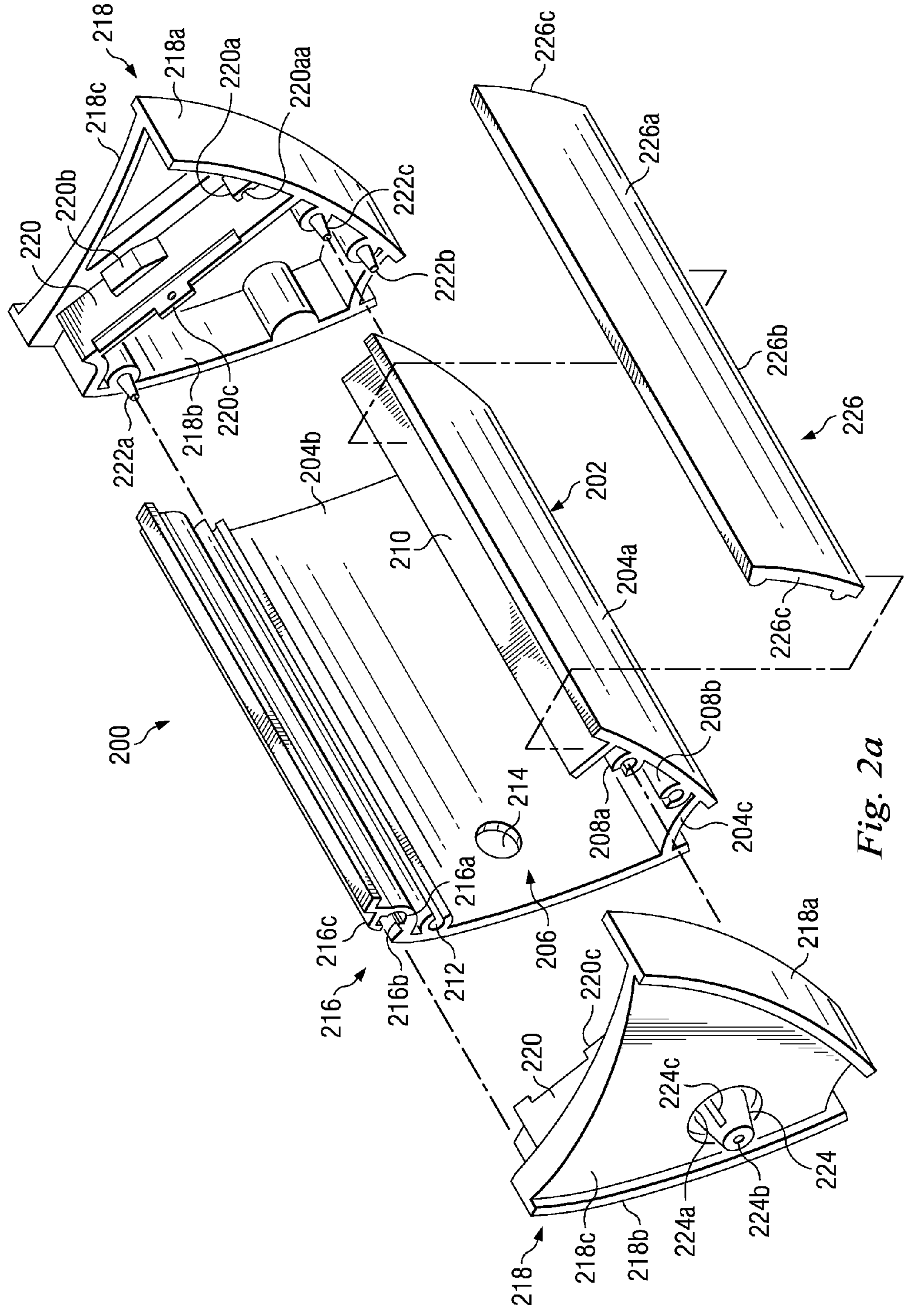
FIG. 2*a* is an exploded view illustrating an exemplary embodiment of a lighting device chassis used in the lighting apparatus of FIG. 1.
Figure 2B:
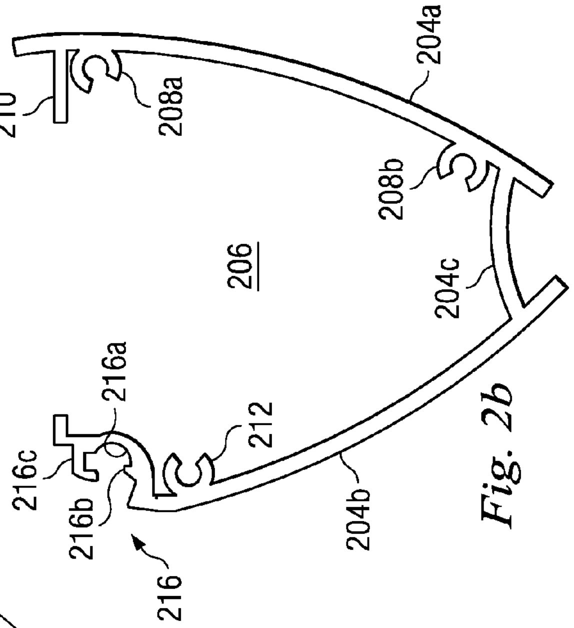
FIG. 2*b* is a side view illustrating an exemplary embodiment of a chassis base used in the lighting device chassis of FIG. 2*a*.
Figure 2C:
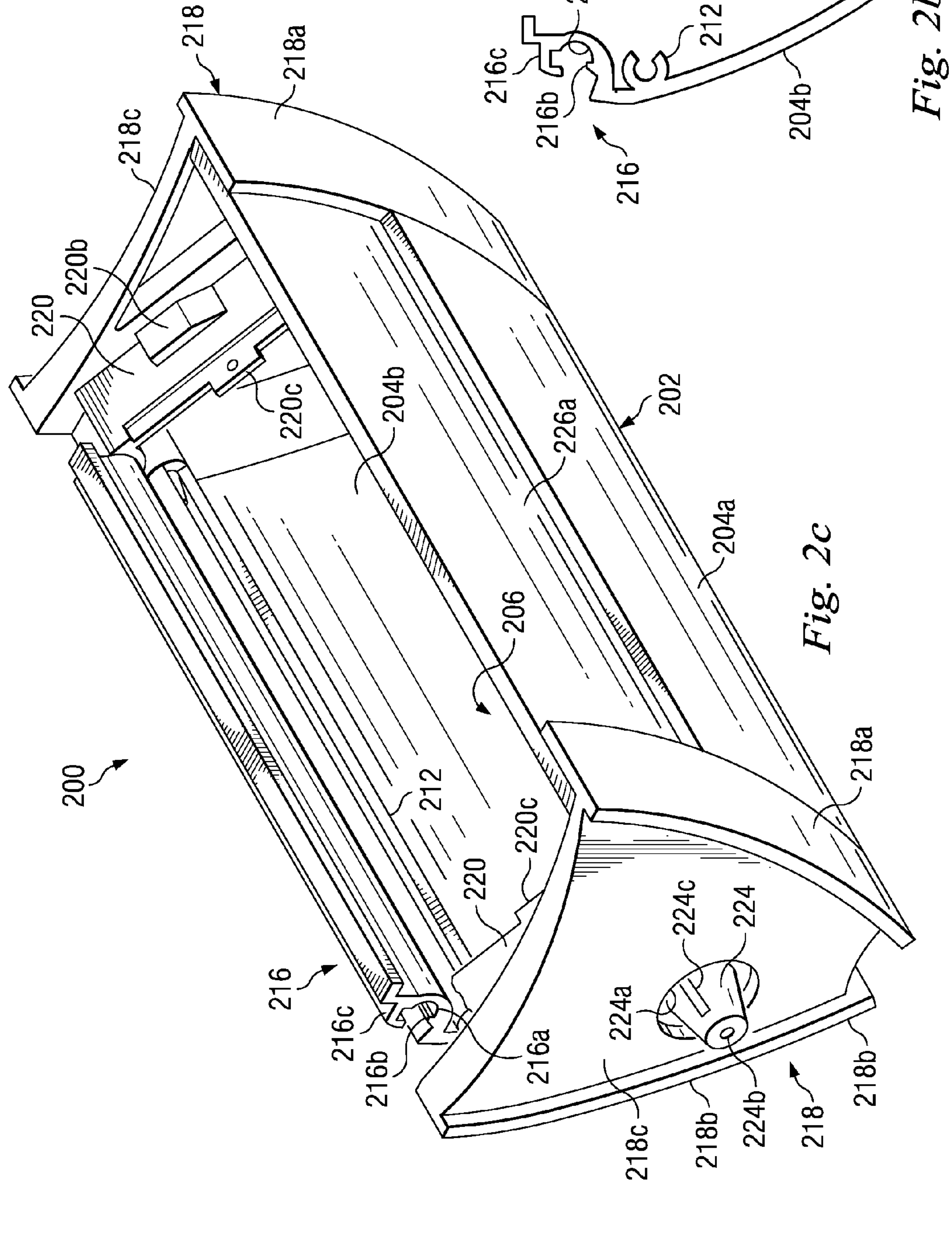
FIG. 2*c* is a perspective view illustrating an exemplary embodiment of the lighting device chassis of FIG. 2*a*.

A pair of substantially similar end caps 218 are coupled to opposing ends of the chassis base 202, illustrated in FIGS. 2*a* and 2*c*. Each end cap 218 includes a front wall 218*a* and a rear wall 218*b* that extend from a side wall 218*c* in a substantially V-shaped orientation. A door support 220 extends between the front wall 218*a*, the rear wall 218*b*, and the side wall 218*c*. An L-shaped door securing member 220*a* extends from the door support 220 and defines a securing channel 220*aa*. A door rest 220*b* extends from the door support 220 and is located adjacent the side wall 218*c* in a spaced apart orientation from the door securing member 220*a*. A reflector securing member 220*c* extends from an edge of the door support 220 opposite the side wall 218*c* and between the front wall 218*a* and the rear wall 218*b*. A chassis coupling member 222*a* extends from the end cap 218 and is located adjacent the rear wall 218*b* and the door support 220. A chassis coupling member 222*b* extends from the end cap 218 and is located adjacent the front wall 218*b*. A chassis coupling member 222*c* extends from the end cap 218 and is located adjacent the front wall 218*a* and the door support 220 in a spaced apart orientation from the chassis coupling member 222*b*. A conical rotational coupling member 224 extends from a coupling member channel 224 that is defined by the side wall 218*c*. The rotational coupling member 224 defines a fastener coupler 224*b* that extends partially through the center of the rotational coupling member 224. A coupling member stop beam 224*c* extends from the rotational coupling member 224 and along a length of the rotational coupling member 224. The end caps 218 may be coupled to the chassis base 202 using a variety of methods known in the art such as, for example, engaging the chassis coupling members 222*a*, 222*b*, and 222*c* with the end cap coupling members 212, 208*b*, and 208*a*, respectively, and/or welding the end caps 218 to the chassis base 202. In an exemplary embodiment, the end caps 218 may include a variety of different designs other than the substantially V-shaped design illustrated in FIGS. 2*a* and 2*c*.

A visor 226 is coupled to the end caps 218 and the chassis base 202. The visor 226 includes a base 226*a* having a bottom edge 226*b* that extends between a pair of opposing side edges 226*c*. The visor may be coupled to the end caps 218 and the chassis base 202 using a variety of methods known in the art such as, for example, positioning the side edges 226*c* adjacent the front walls 218*a* of the end caps 218 with the bottom edge 226*b* adjacent the side wall 204*a* and the door support 210 of the chassis base 202 and welding the visor 226 to the end caps 218 and the chassis base 202, as illustrated in FIG. 2*c*. In an embodiment, the base 226*a* of the visor 226 may define a window for allowing light to pass through the base 226*a* of the visor 226, and the window may include a variety of translucent materials known in the art.

Figure 3A:
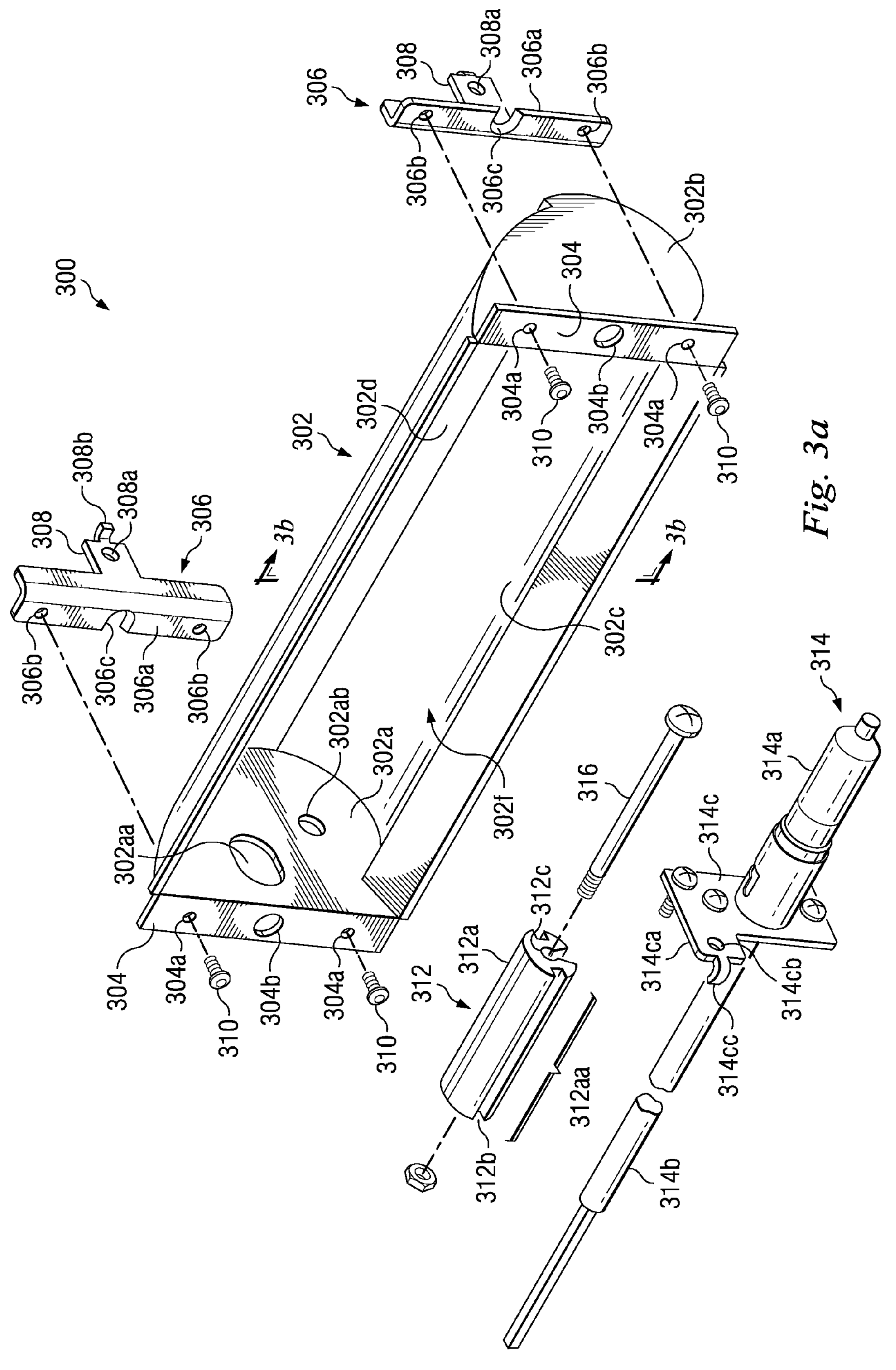
FIG. 3*a* is an exploded view illustrating an exemplary embodiment of a reflector member used in the lighting apparatus of FIG. 1.
Figure 3B:
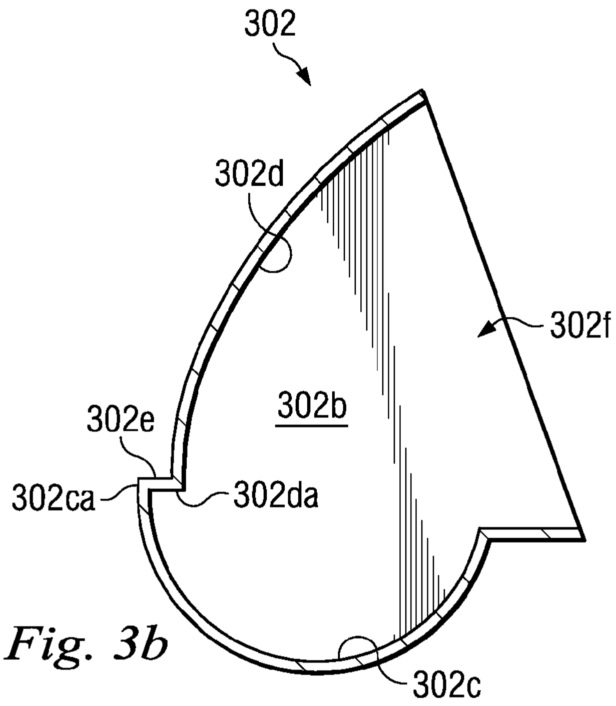
FIG. 3*b* is a cross sectional view illustrating an exemplary embodiment of a reflector used in the reflector member of FIG. 3*a*.

Referring now to FIGS. 1, 2*c*, 3*a*, 3*b*, 3*c*, 3*d*, and 3*e*, the reflector member 300 is illustrated. The reflector member 300 includes a reflector 302 having a pair of side walls 302*a* and 302*b* that are held in a substantially parallel and spaced apart orientation by a first arcuate reflector surface 302*c* and a second arcuate reflector surface 302*d*. The first arcuate reflector surface 302*c* includes a first surface finish and a first reflector edge 302*ca*. In an exemplary embodiment, the first arcuate reflector surface 302*c* has a involute shape, as illustrated in FIG. 3*b*. In an exemplary embodiment, the first arcuate reflector surface 302*c* has a specular surface finish. In an exemplary embodiment, the first arcuate reflector surface 302*c* has a Miro 4 surface finish. The second arcuate reflector surface 302*d* includes a second surface finish that is different from the first surface finish and a second reflector edge 302*da*. In an exemplary embodiment, the second arcuate reflector surface 302*d* has a parabolic shape, as illustrated in FIG. 3*b*. In an exemplary embodiment, the second arcuate reflector surface 302*d* has a diffuse surface finish. In an exemplary embodiment, the second arcuate reflector surface 302*d* has a Miro 5 surface finish. A step wall 302*e* couples the first arcuate reflector surface 302*c* to the second arcuate reflector surface 302*d* such that the first reflector edge 302*ca* is located in a spaced apart orientation from the second reflector edge 302*da*, as illustrated in FIG. 3*b*. The sides walls 302*a* and 302*b*, the first arcuate reflector surface 302*c*, and the second arcuate reflector surface 302*d* define a light housing 302*f* between them. A pair of coupling ledges 304 extend from the side walls 302*a* and 302*b*, each coupling ledge 304 defining a pair of bracket couplers 304*a* and a chassis coupler 304*b* in a spaced apart orientation along its length. The side wall 302*a* defines a support member mounting aperture 302*aa* and a cable passageway 302*ab* that provide access to the light housing 302*f* through the side wall 302*a*.

Figure 3D:
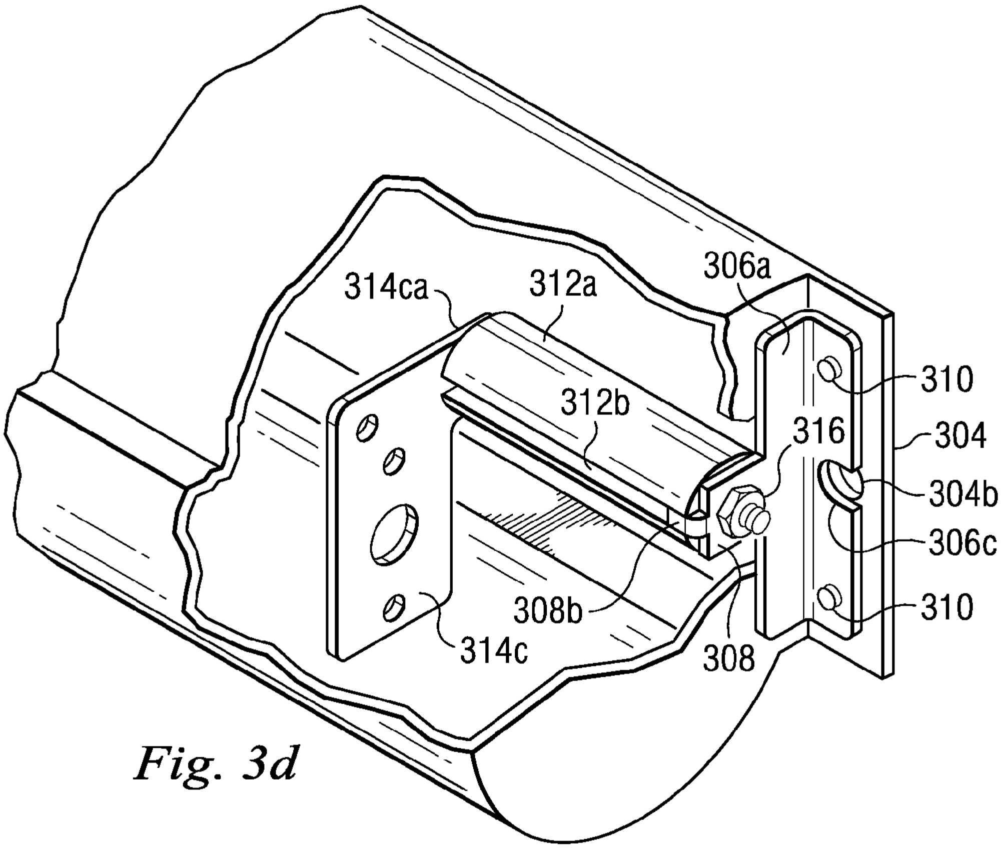
FIG. 3*d* is a cut-away perspective view illustrating an exemplary embodiment of the reflector member of FIG. 3*c*.
Figure 3C:
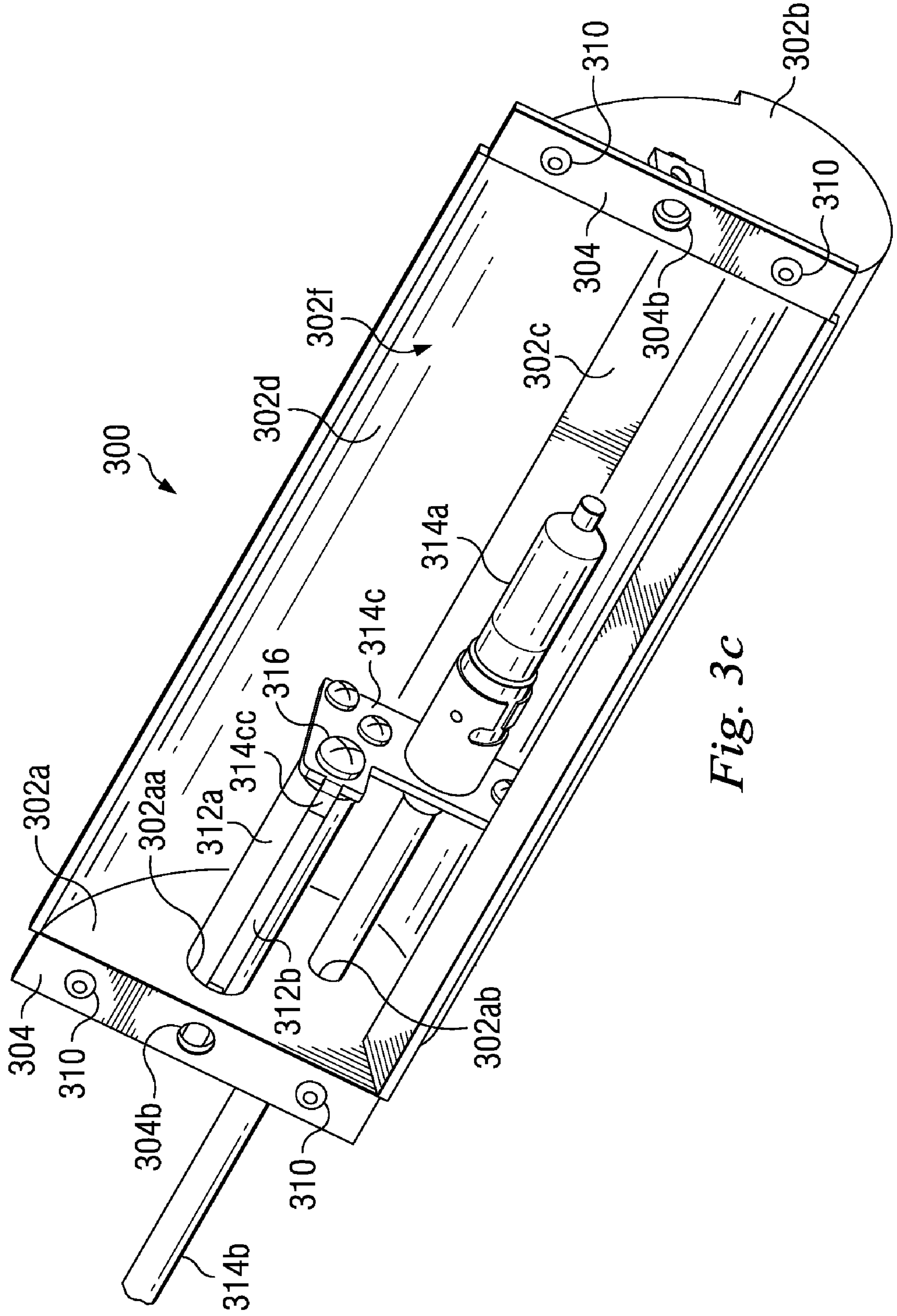
FIG. 3*c* is a perspective view illustrating an exemplary embodiment of the reflector member of FIG. 3*a*.

A pair of brackets 306 are coupled to the reflector 302. Each bracket 306 includes a base 306*a* having an L-shaped cross section. The base 306*a* defines a pair of coupling apertures 306*b* on either end of the base 306*a* and a fastener channel 306*c* located between the coupling apertures 306*b*. A support beam 308 extends from the base 306*a*, defines a coupling aperture 308*a* through its center, and includes a support arm 308*b* that extends substantially perpendicularly from the support beam 308. The brackets 306 may be coupled to the reflector 302 using a variety of methods known in the art such as, for example, positioning a plurality of rivets 310 through the bracket couplers 304*a* on the coupling ledges 304 of the reflector 302 and through the coupling apertures 306*b* on the brackets 306, as illustrated in FIGS. 3*c* and 3*d*. With the bracket 306 coupled to the reflector 302 adjacent the side wall 302*a*, the support beam 308 is positioned adjacent the support member mounting aperture 302*aa*.

A lighting device support member 312 is coupled to the bracket 306 and extends through the support member mounting aperture 302*aa*. The lighting device support member 312 includes an elongated base 312*a* having a length 312*aa*. The base 312*a* defines a pair of support channels 312*b* located on opposite sides of the base 312*a* and running along the length of the base 312*a*. A fastener channel 312*c* is also defined by the base 312*a*, is centrally located on the base 312*a* between the support channels 312*b*, and runs along the length of the base 312*a*. The lighting device support member 312 is positioned in the support member mounting aperture 302*aa* and coupled to the bracket 306 partially due to the support arm 308*b* on the support beam 308 being positioned in the support channel 312*b*, as illustrated in FIGS. 3*c* and 3*d*.

A lighting device 314 is coupled to the lighting device support member 312 and positioned in the light housing 302*f*. The lighting device 314 includes a lamp 314*a* having a cable 314*b* that extends from the lamp 314*a* and is operable to provide power to the lamp 314*a*. A bracket 314*c* is coupled to the lamp 314*a* and includes a support beam 314*ca* that extends from the bracket 314*c*. The support beam 314*ca* defines a fastener coupler 314*cb* and includes a support arm 314*cc* that extends substantially perpendicularly from the support beam 314*ca*. The lighting device 314 is coupled to the lighting device support member 312 by positioning the support arm 314*cc* on the bracket 314*c* in the support channel 312*b* on the lighting device support member 312 and positioning a fastener 316 through the fastener coupler 314*cb* on the bracket 314*c*, the fastener channel 312*c* on the lighting device support member 312, and the coupling aperture 308*a* on the bracket 306, illustrated in FIGS. 3*c* and 3*d*. The fastener 316 also helps to couple the bracket 306 to the lighting device support member 312. The cable 314*b* from the lighting device 314 may exit the light housing 302*f* through the cable passageway 302*ab*, as illustrated in FIG. 3*c*, and be connected to a conventional power supply known in the art. In an exemplary embodiment, with the lighting device 314 coupled to the lighting device support member 312, the lamp 314*a* is centrally positioned in the light housing 302*f*. The positioning of the lighting device 314 with the lighting device support member 312 allows the lamp 314*a* to be precisely positioned in the light housing 302*f* without the need for any support members extending from or though the first arcuate reflector surface 302*c* and the second arcuate reflector surface 302*d* such that there are no structures or apertures on or in the first arcuate reflector surface 302*c* and the second arcuate reflector surface 302*d* that might provide interference between the lamp 314*a* and the first arcuate reflector surface 302*c* and the second arcuate reflector surface 302*d*. The positioning of the support arms 308*b* and 314*cc* on the brackets 306 and 314*c*, respectively, in the support channels 31*b* on the lighting device support member 312 and the positioning of the lighting device support member 312 in the support member mounting aperture 302*aa* prevent rotation of the lamp 314*a* and the lighting device 314. In an exemplary embodiment, the lighting device support member 312 provides a heat sink for the light 314 during the operation of the light 314. In an exemplary embodiment, the use of the lighting device support member 312 and the brackets 306 and 314*c* provide a lighting device mount with less parts than a conventional lighting device mount such that the tolerance circuit for the lighting device mount is lowered. In an exemplary embodiment, the length 312*aa* of the lighting device support member 312 may be varied depending on desired positioning of the lamp 314*a* along the length of the horizontal axis of the reflector 302. In an exemplary embodiment, the side wall 302*b* may define apertures similar to those defined by side wall 302*a*, and a lighting device support member similar to the lighting device support member 312 may be coupled to and/or extend from the side wall 302*b* in order to provide additional support for the lighting device from the side wall 302*b*.

Figure 3E:
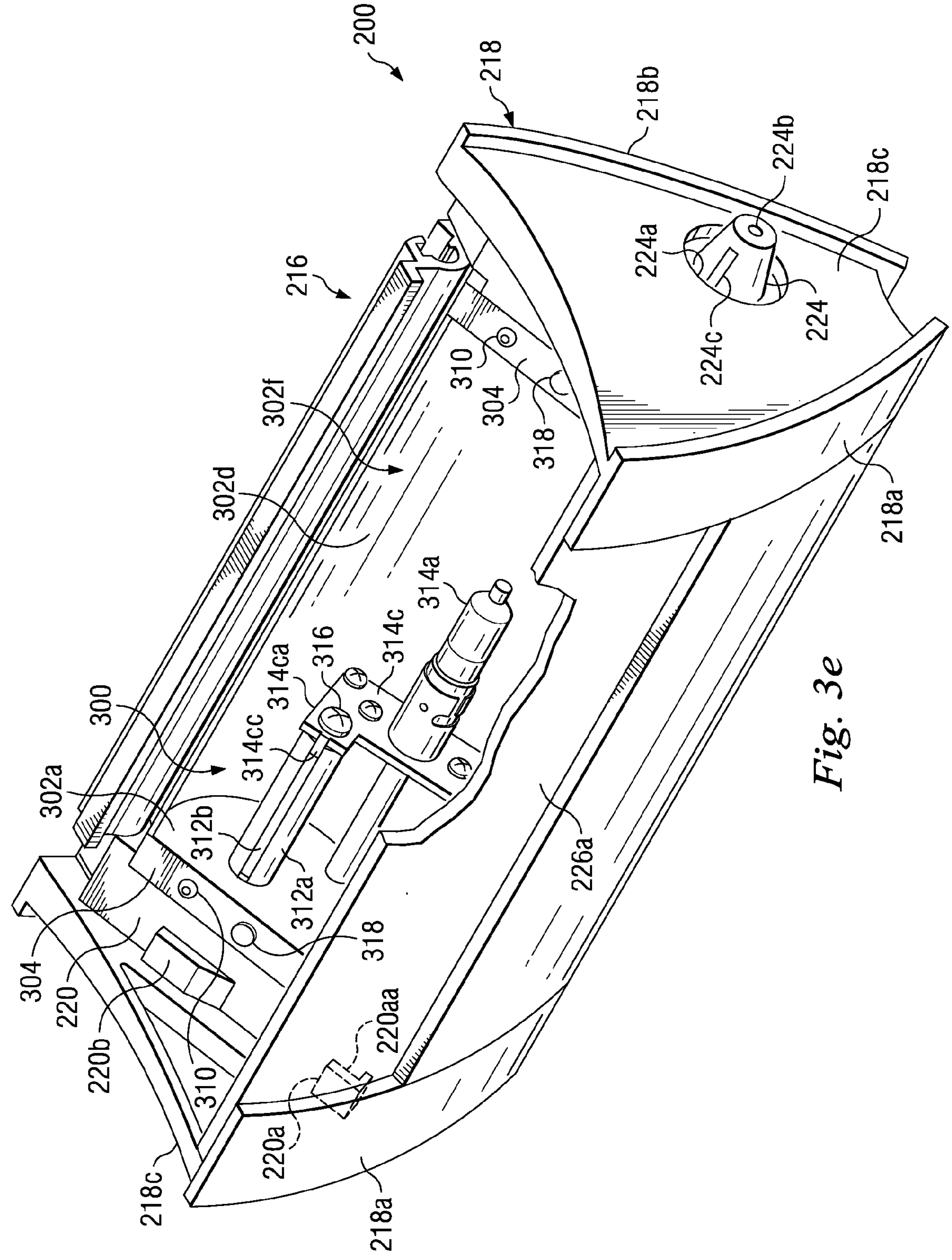
FIG. 3*e* is a perspective view illustrating an exemplary embodiment of the reflector member of FIG. 3*c* coupled to the lighting device chassis of FIG. 2*c*.

The reflector member 300 is coupled to the lighting device chassis 200 by positioning the reflector member 300 in the lighting device housing 206 on the lighting device chassis 200 such that the chassis couplers 304*b* defined by the coupling ledges 304 on the reflector member 300 are positioned immediately adjacent the reflector securing members 220*c* defined by the end caps 218 on the lighting device chassis 200. A plurality of fasteners 318 are then positioned in the chassis couplers 304*b* and the reflector securing members 220*c* to secure the reflector member 300 to the lighting device chassis 200, as illustrated in FIG. 3*e*. In operation, the first arcuate reflector surface 302*c* with the first surface finish is designed to direct light away from the reflector member 300 at any angle while the second arcuate reflector surface 302*d* with the second surface finish is designed to diffuse light from the reflector member 300.

Referring now to FIGS. 4*a*, 4*b*, 4*c*, 4*d*, 4*e*, 4*f*, 4*g*, 4*h*, 4*i*, 4*j*, 4*k*, 4*l*,4*m*, and 4*n*, the door 400 is illustrated. The door 400 includes a base 402 having a top surface 402*a*, a bottom surface 402*b* located opposite the top surface 402*a*, a front edge 402*c* extending between the top surface 402*a* and the bottom surface 402*b*, a rear edge 402*d* located opposite the front edge 402*c* and extending between the top surface 402*a* and the bottom surface 402*b*, and a pair of opposing side edges 402*e* extending between the top surface 402*a*, the bottom surface 402*b*, the front edge 402*c*, and the rear edge 402*d*. A light passageway 404 is defined by the base 402 and extends through the base 402 from the top surface 402*a* to the bottom surface 402*b*. A plurality of securing channels 406 are defined by the base 402, extend through the base 402 from the top surface 402*a* to the bottom surface 402*b*, and are located adjacent the sides walls 402*e* on either side of the light passageway 404. A louver channel 408*a* and a louver channel 408*b* are defined by the base 402 and located adjacent the opposing side edges 402*e*. A door support 410 extends from the front edge 402*c* of the base 402 and along a length of the base 402 in a substantially perpendicular orientation to the base 402.

A chassis coupling member 412 extends from the rear edge 402*d* of the base 402 and along a length of the base 402 in a substantially perpendicular orientation to the base 402. The chassis coupling member 412 includes an arcuate distal end 412*a* that defines a coupling channel 412*b*. A stop member 412*c* extends from the arcuate distal end 412*a* and is located opposite the coupling channel 412*b*. A stop surface 412*d* is included on the chassis coupling member 412 and located adjacent the arcuate distal end 412*a*.

Figure 4A:
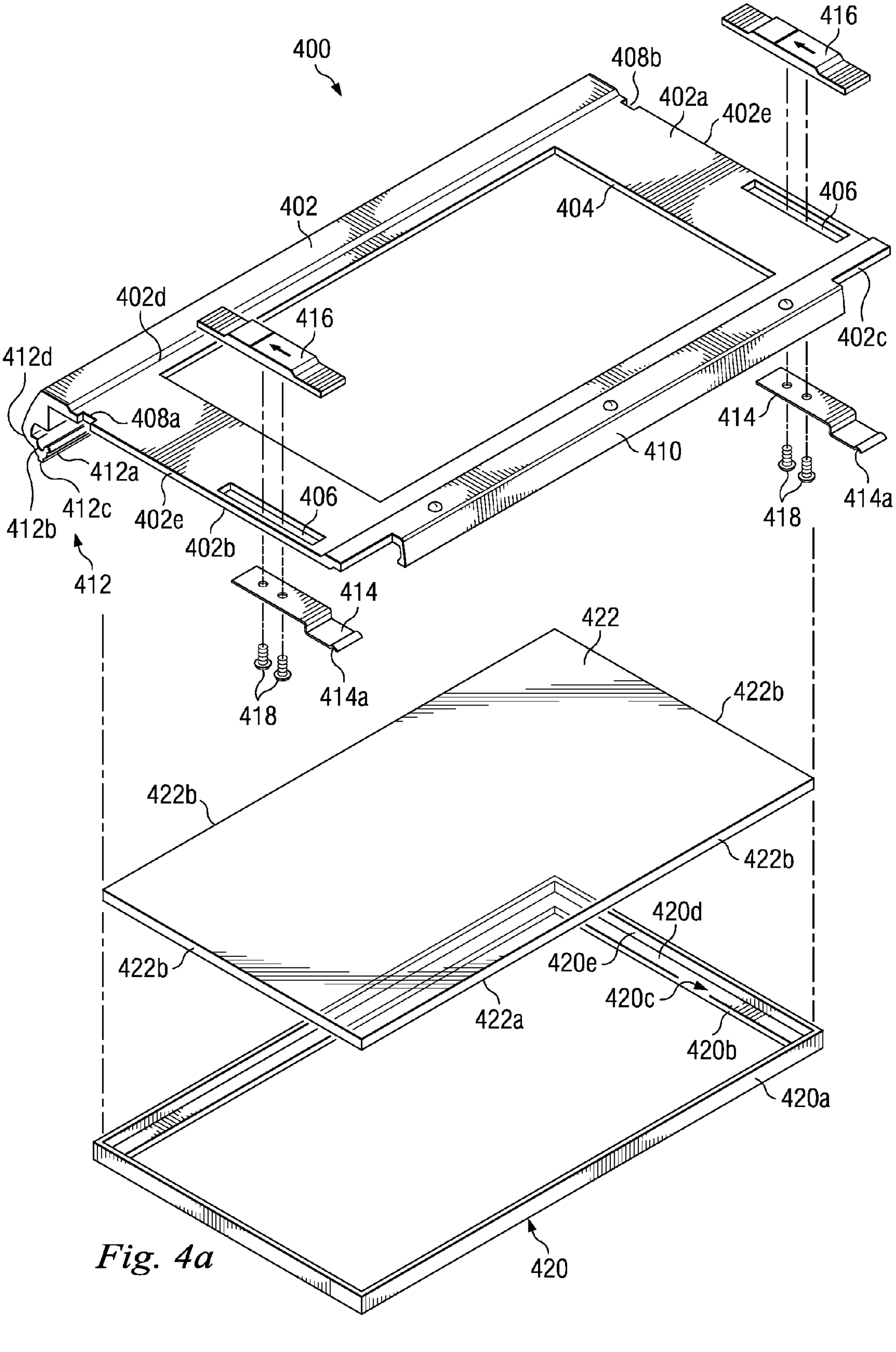
FIG. 4*a* is an exploded view illustrating an exemplary embodiment of a door used in the lighting apparatus of FIG. 1.
Figure 4B:
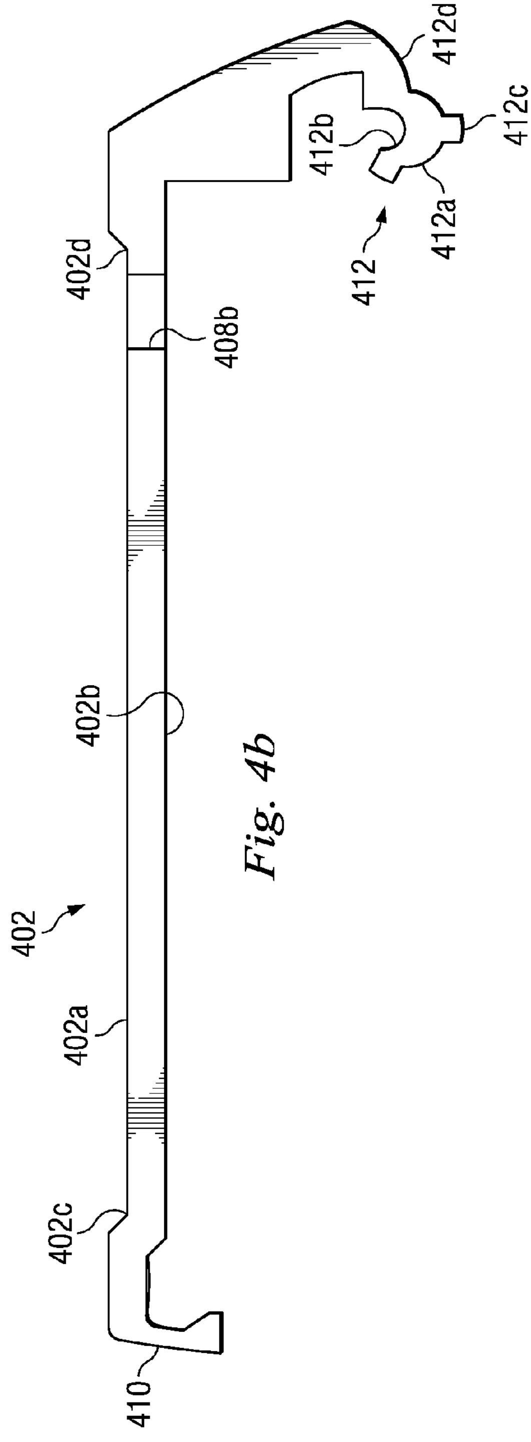
FIG. 4*b* is a side view illustrating an exemplary embodiment of a door base used in the door of FIG. 4*a*.
Figure 4F:
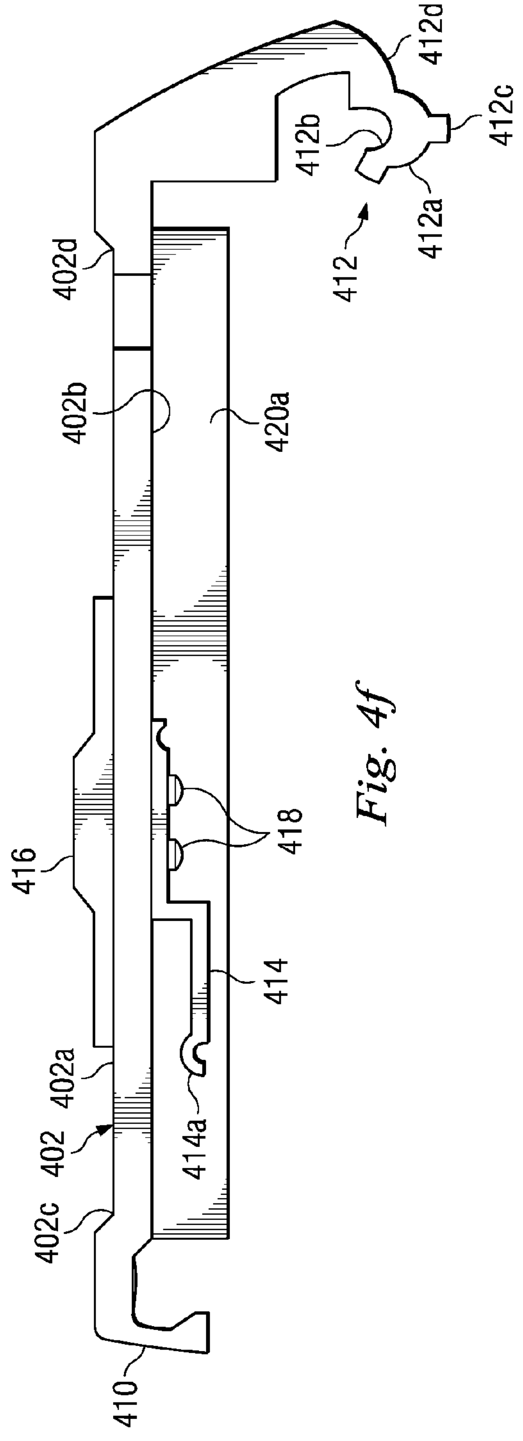
FIG. 4*f* is a cross sectional view illustrating an exemplary embodiment of the door of FIG. 4*e*.
Figure 4C:
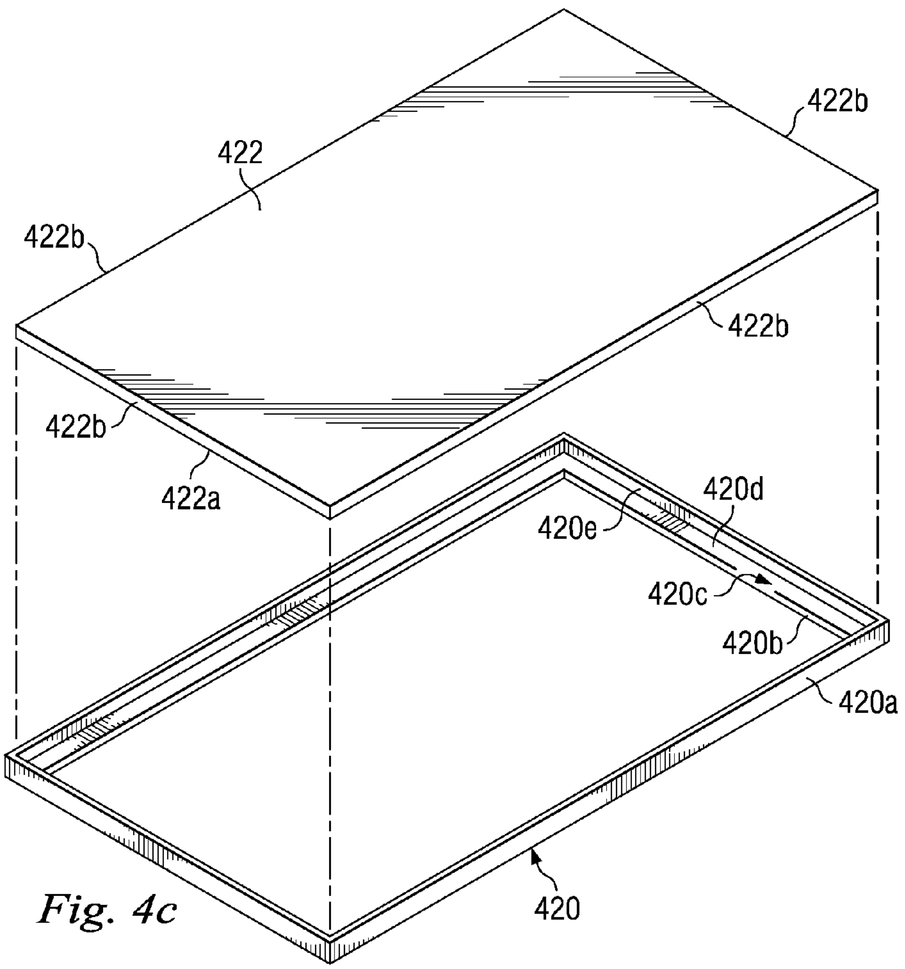
FIG. 4*c* is a perspective view illustrating an exemplary embodiment of the coupling of a lens and a gasket used in the door of FIG. 4*a*.
Figure 4D:
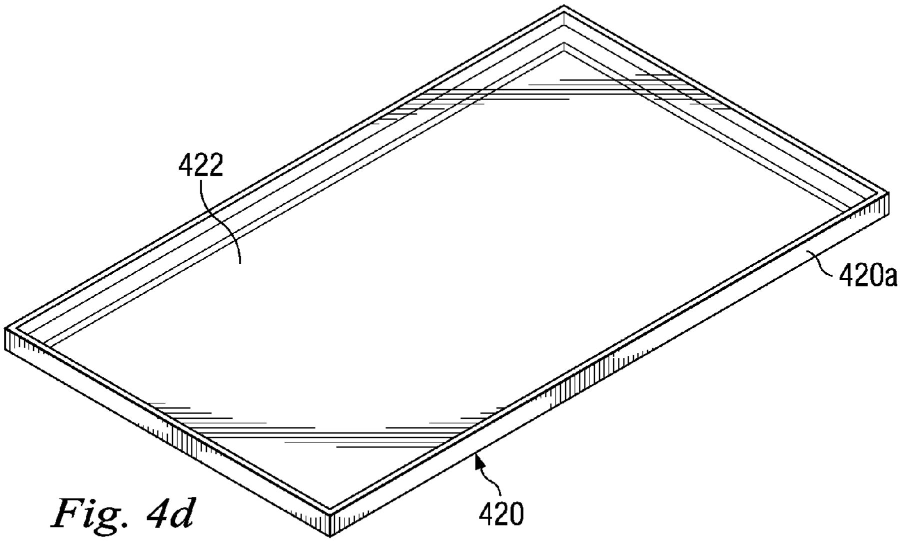
FIG. 4*d* is a perspective view illustrating an exemplary embodiment of the lens of FIG. 4*c* coupled to the gasket of FIG. 4*c*.
Figure 4E:
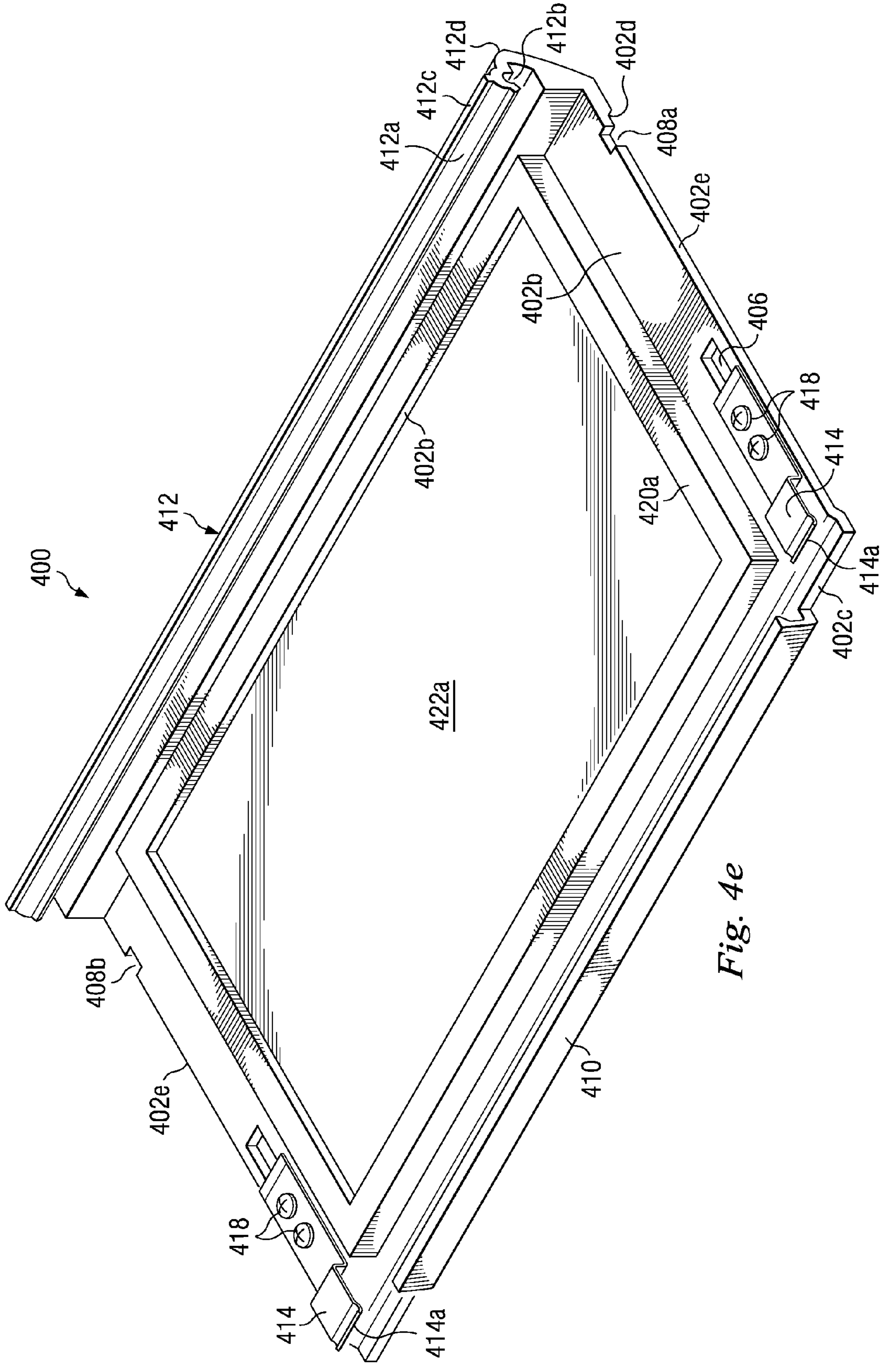
FIG. 4*e* is a perspective view illustrating an exemplary embodiment of the lens, gasket, and door base of FIG. 4*a* coupled together.
Figure 4G:
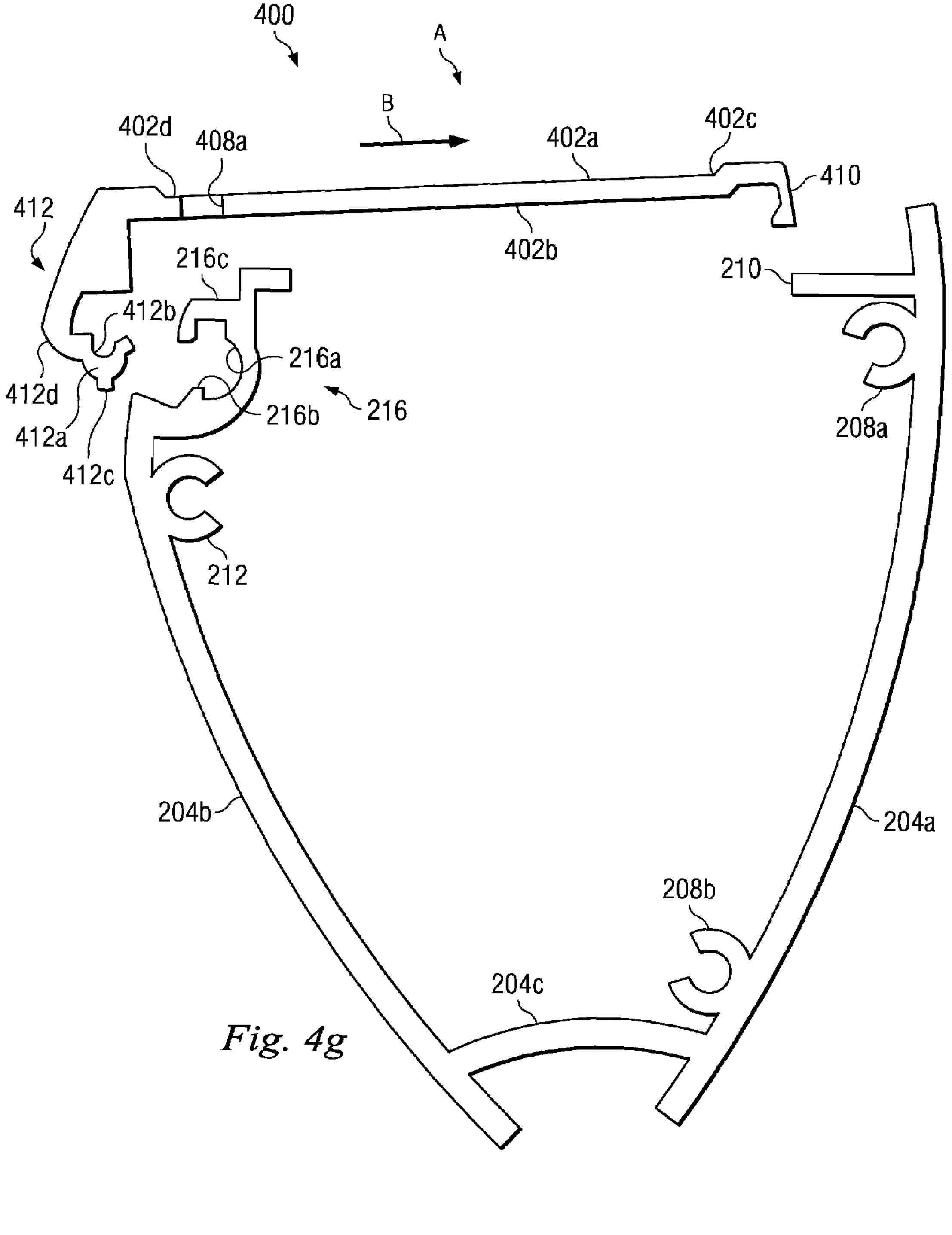
FIG. 4*g* is a side view illustrating an exemplary embodiment of the door base of FIG. 4*b* being coupled to the chassis base of FIG. 2*b*.
Figure 4H:
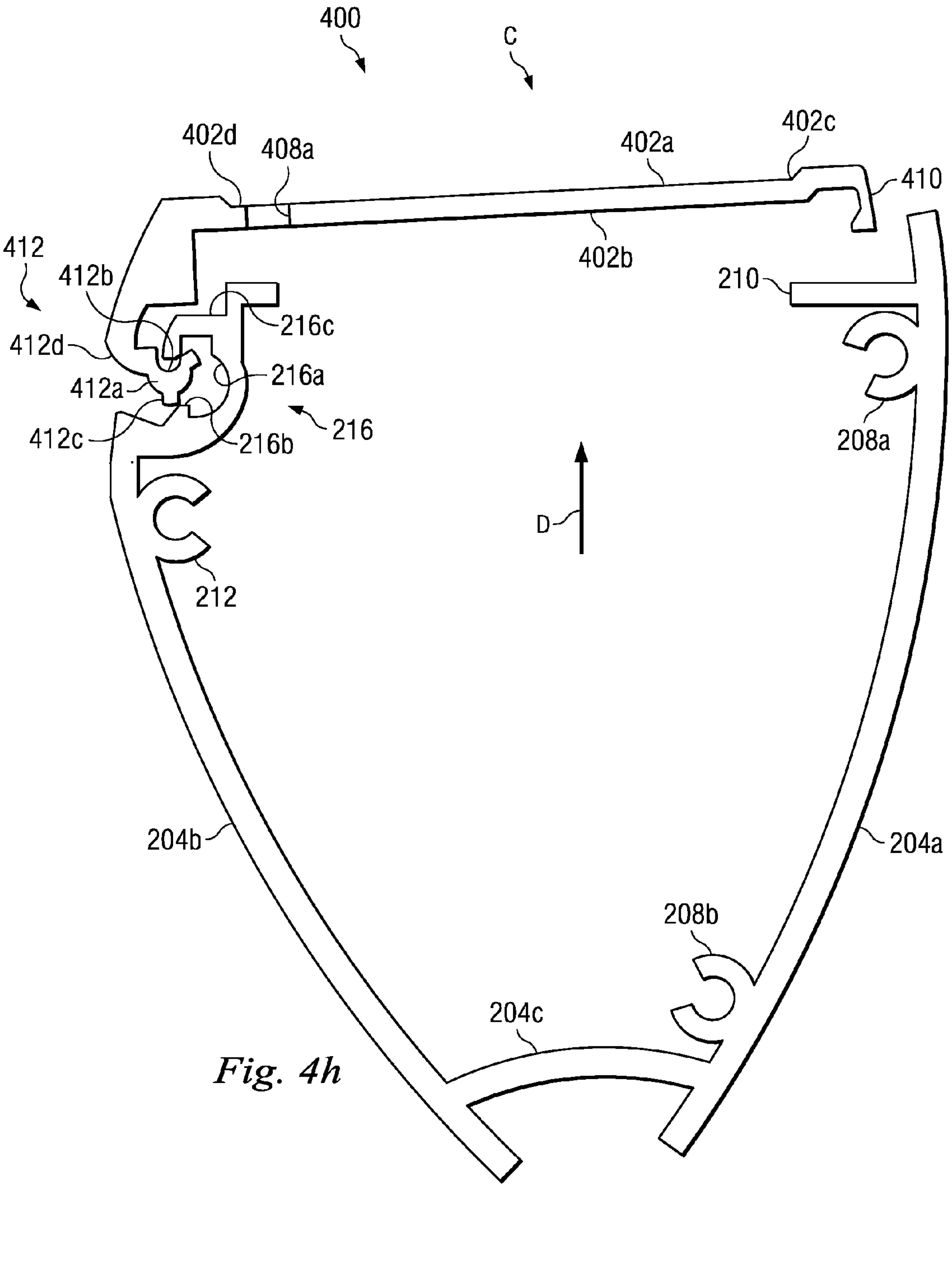
FIG. 4*h* is a side view illustrating an exemplary embodiment of the door base of FIG. 4*b* being coupled to the chassis base of FIG. 2*b*.
Figure 4I:
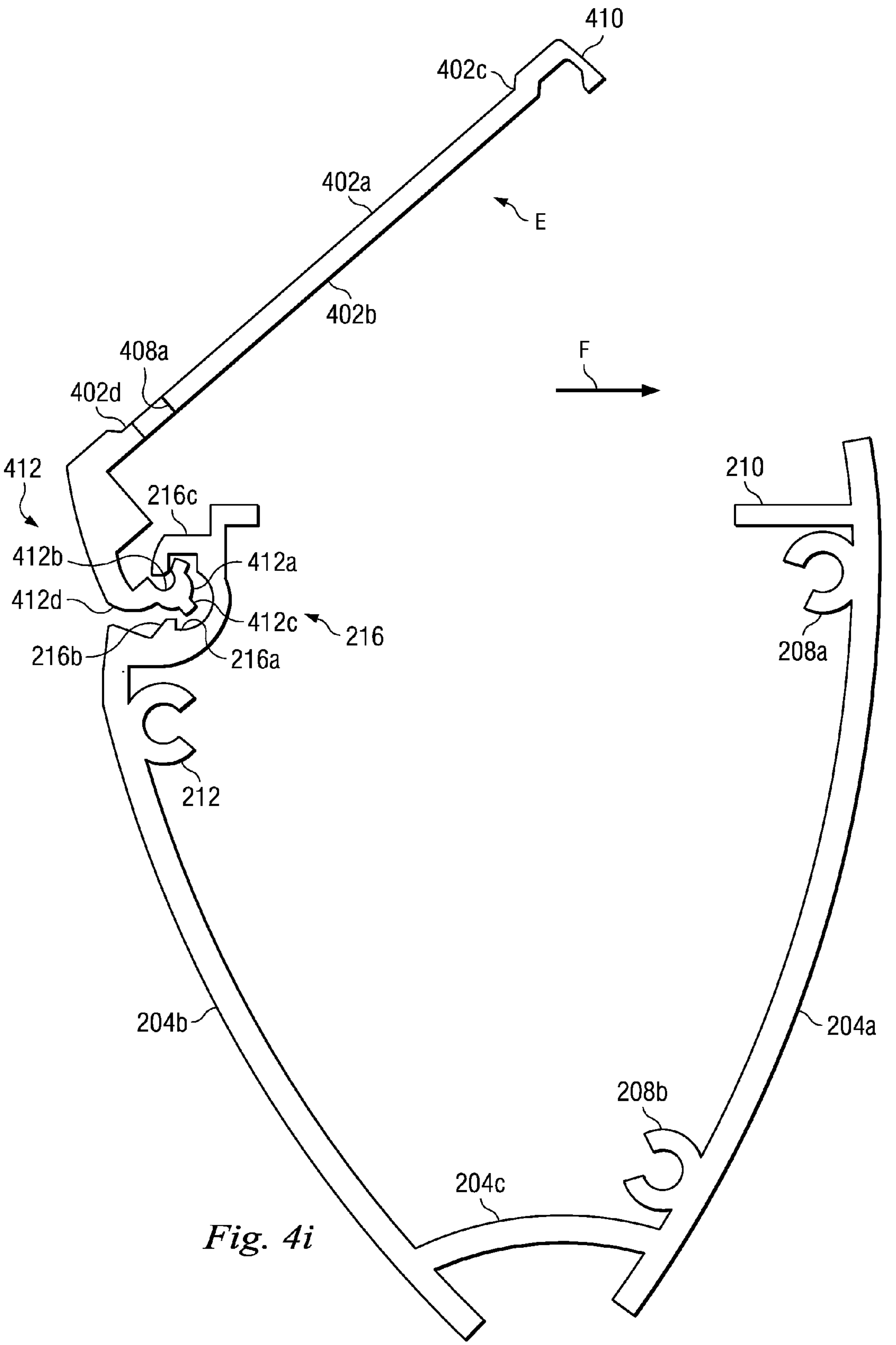
FIG. 4*i* is a side view illustrating an exemplary embodiment of the door base of FIG. 4*b* being coupled to the chassis base of FIG. 2*b*.

A latch 414 and a latch actuator 416 are coupled to each securing channel 406 by a plurality of fasteners 418 that engage the latch 414 and the latch actuator 416 such that the latch actuators 416 are positioned adjacent the top surface 402*a* of the base 402 and the latches 414 are positioned adjacent the bottom surface 402*b* of the base 402, illustrated in FIGS. 4*a*, 4*e* and 4*f*. Each latch 414 includes an arcuate distal end 414*a* located opposite its connection to the latch actuator 416.

A rectangular gasket 420 and a rectangular lens 422 are coupled to each other and the base 402. The gasket 420 includes a rectangular base 420*a* that defines a rectangular light passageway 420*b* through its center. A rectangular lens mounting channel 420*c* is defined by a first channel surface 420*d* and a second channel surface 420*e* on the base 420*a* and located adjacent the perimeter of the light passageway 420*b*. In an exemplary embodiment, the first channel surface 420*d* is substantially perpendicular to the second channel surface 420*e*. The lens 422 includes a first lens surface 422*a* and a second lens surface 422*b* that is substantially perpendicular to the first lens surface 422*a* and located about the perimeter of the lens 422. The lens 422 is positioned in the lens mounting channel 420*c* such that a portion of the first lens surface 422*a* engages the first channel surface 420*d* and the second lens surface 422*b* engages the second channel surface 420*e*, illustrated in FIGS. 4*c* and 4*d*. The lens 422 may be coupled to the gasket 420 using a variety of methods known in the art such as, for example, adhesives. The gasket 420 is then positioned adjacent the bottom surface 402*b* of the base 402 such that the light passageway 420*b* defined by the gasket 420 is substantially aligned with the light passageway 404 defined by the base 402 and between the latches 414, illustrated in FIGS. 4*e* and 4*f*. The gasket 420 may be coupled to the base 402 using a variety of methods known in the art such as, for example, adhesives. In operation, the surfaces 420*e* on the gasket 420 prevent light from escaping from the lens 422 through the second lens surface 422*b*. Furthermore, the gasket 420 eliminates the need for a frame coupled to the lens 422 to prevent light from escaping from second lens surface 422*b* on the lens 422.

The door 400 is operable to pivotally couple to and decouple from the lighting device chassis 200. The door 400 may be pivotally coupled to the lighting device chassis 200 by first positioning the door 400 in a position A, illustrated in FIG. 4*g*, such that the chassis coupling member 412 on the door 400 is positioned adjacent the door coupling member 216 on the lighting device chassis 200 and the door support 410 on the door 400 is positioned adjacent the door support 210 on the lighting device chassis 200. The door 400 is then moved in a direction B such that a portion of the arcuate distal end 412*a* of the chassis coupling member 412 enters the door coupling channel 216*a* and the door 400 is in a position C, illustrated in FIG. 4*h*. The door 400 is then moved in a direction D such that a portion of the support beam 216*c* enters the coupling channel 412*b* and the stop member 412*c* on the chassis coupling member 412 may clear the stop member 216*b* on the door coupling member 216 when the door 400 is rotated about the support beam 216*c* into a position E, illustrated in FIG. 4*i*.

Figure 4J:
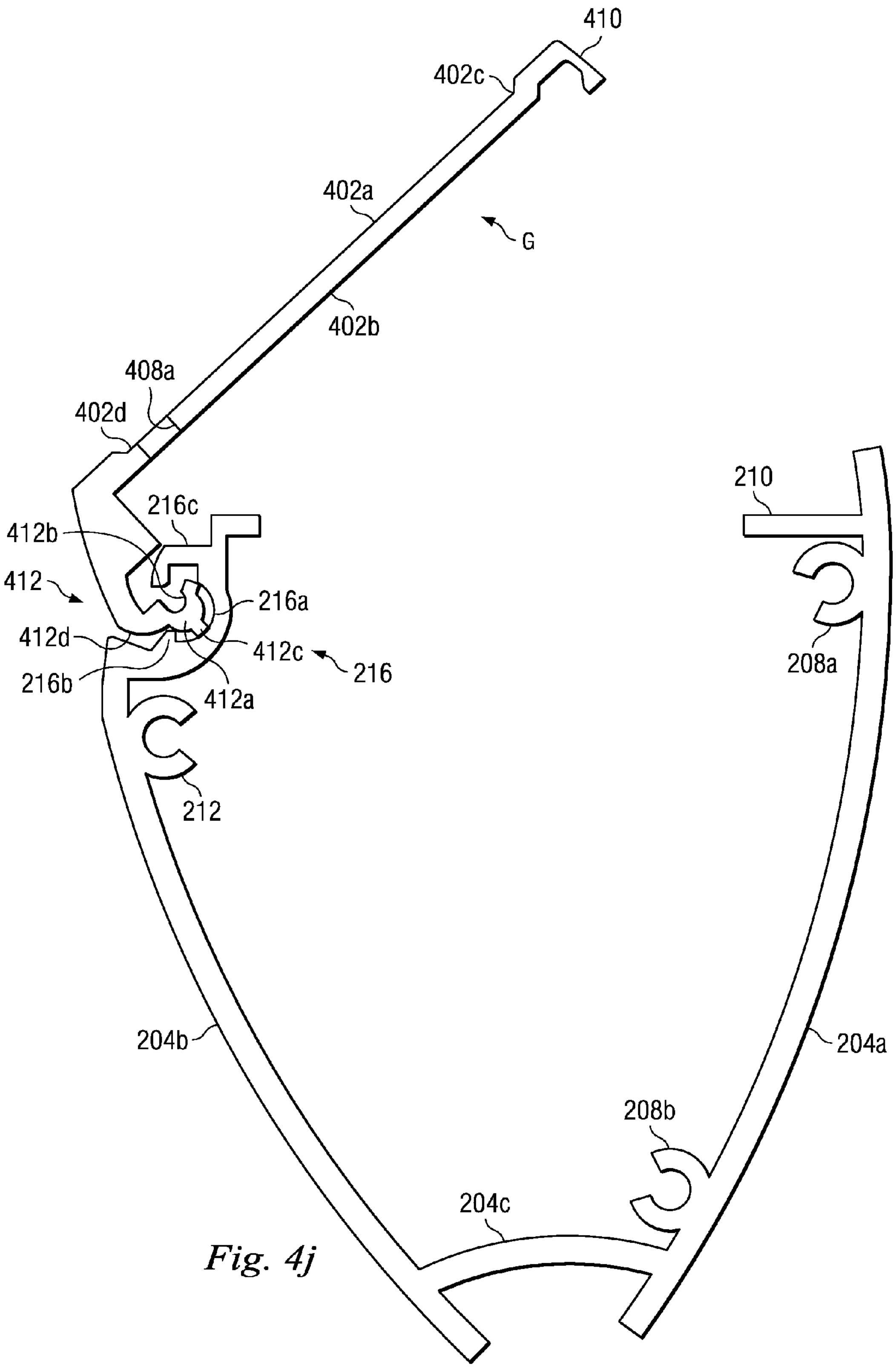
FIG. 4*j* is a side view illustrating an exemplary embodiment of the door base of FIG. 4*b* coupled to the chassis base of FIG. 2*b*.
Figure 4K:
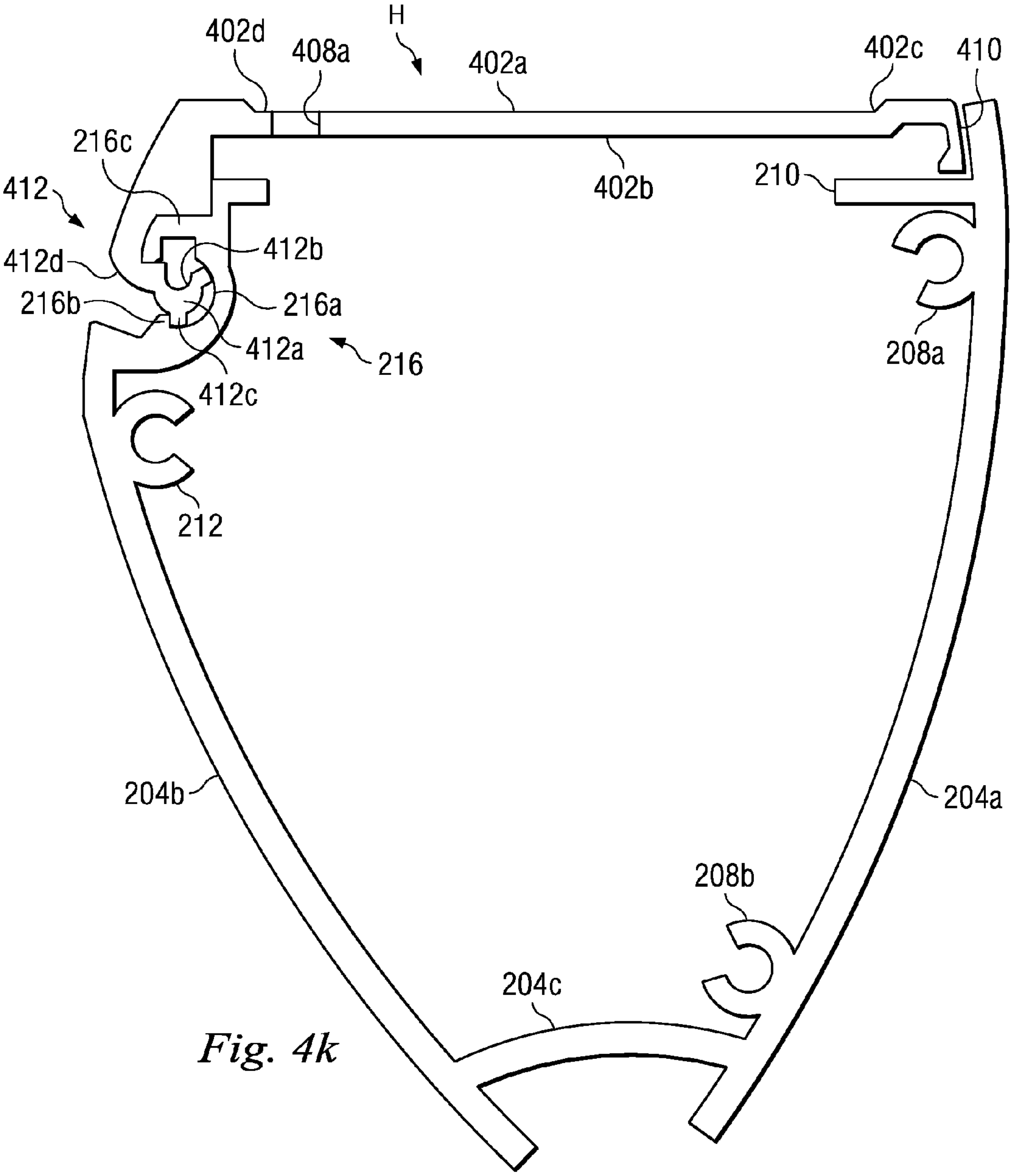
FIG. 4*k* is a side view illustrating an exemplary embodiment of the door base of FIG. 4*b* coupled to the chassis base of FIG. 2*b*.
Figure 4L:
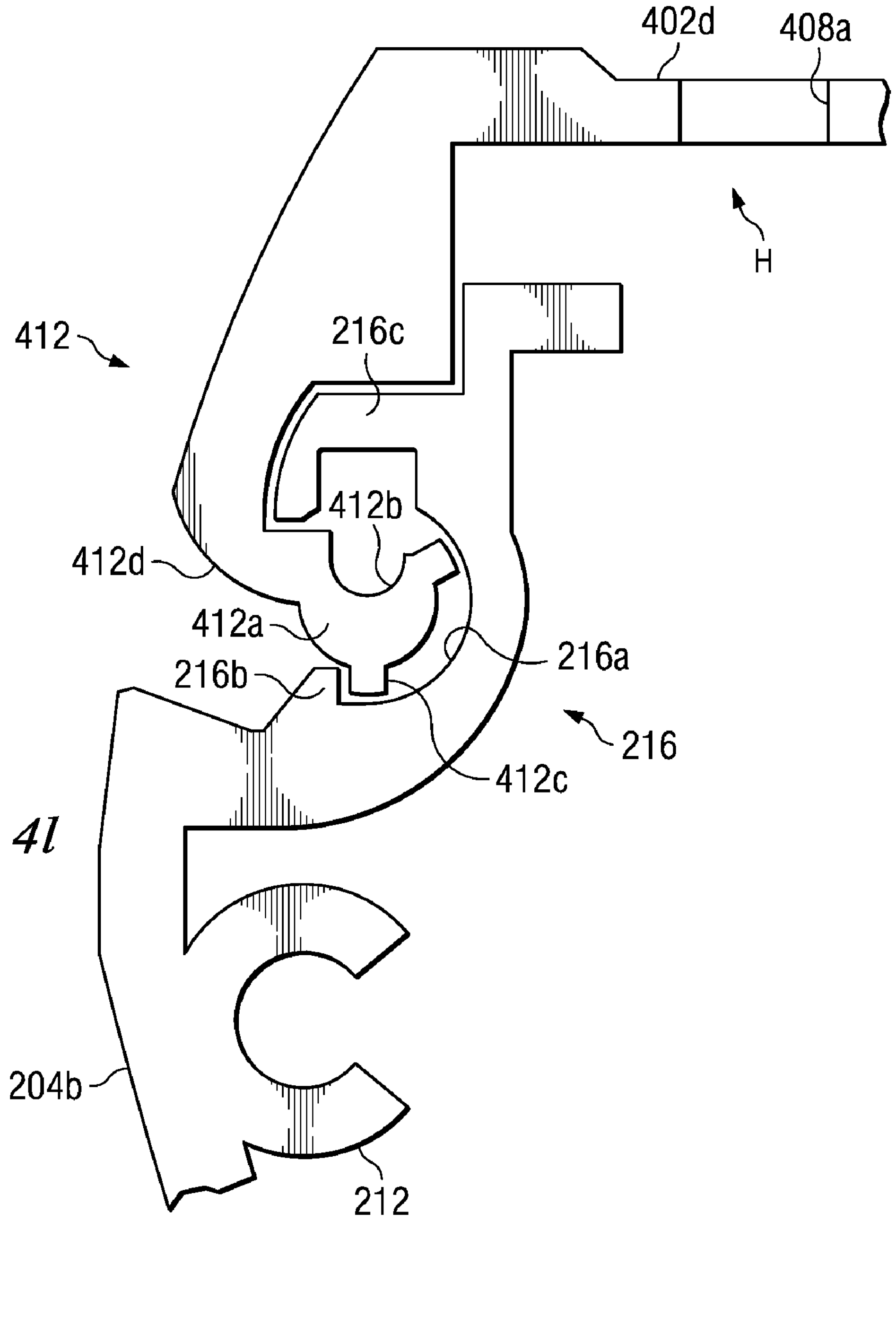
FIG. 4*l* is a side view illustrating an exemplary embodiment of the door base of FIG. 4*b* coupled to the chassis base of FIG. 2*b*.

The door 400 is then moved in a direction F such that door 400 is in a position G with the stop member 216*b* and the arcuate distal end 412*a* of the chassis coupling member 412 positioned in the door coupling channel 216*a*, as illustrated in FIG. 4*j*. In the position G, the door 400 is coupled to the lighting device chassis 200 in an open position, and the stop surface 412*d* on the door 400 will engage the side wall 204*b* to prevent over-rotation of the door 400. With the stop member 412*c* and the arcuate distal end 412*a* of the chassis coupling member 412 positioned in the door coupling channel 216*a*, the door 400 may now be rotated about the door coupling channel 216*a* into a position H, illustrated in FIGS. 4*k* and 4*l*. In the position H, the door 400 is coupled to the lighting device chassis 200 in a closed position, and the stop member 412*c* on the chassis coupling member 412 engages the stop member 216*b* on the door coupling member 216 to prevent the chassis coupling member 412 from decoupling from the door coupling member 216, illustrated in FIGS. 4*k* and 4*l*. Also, in the position H, the chassis coupling member 412 engages the support beam 216*c* on the lighting device chassis 200 and the door support 410 on the door 400 may engage the door support 210 on the lighting device chassis 200. The door 400 may then be decoupled from the lighting device chassis 200 by reversing the steps shown in FIGS. 4*g*, 4*h*, 4*i*, 4*j*, and 4*k*. Thus, the door 400 is provided that may be pivotally coupled to the lighting device chassis 200 without a hinge and removed from the lighting device chassis 200 by manipulating the door 400 as described above in FIGS. 4*g*, 4*h*, 4*i*, 4*j*, and 4*k*.

Figure 4M:
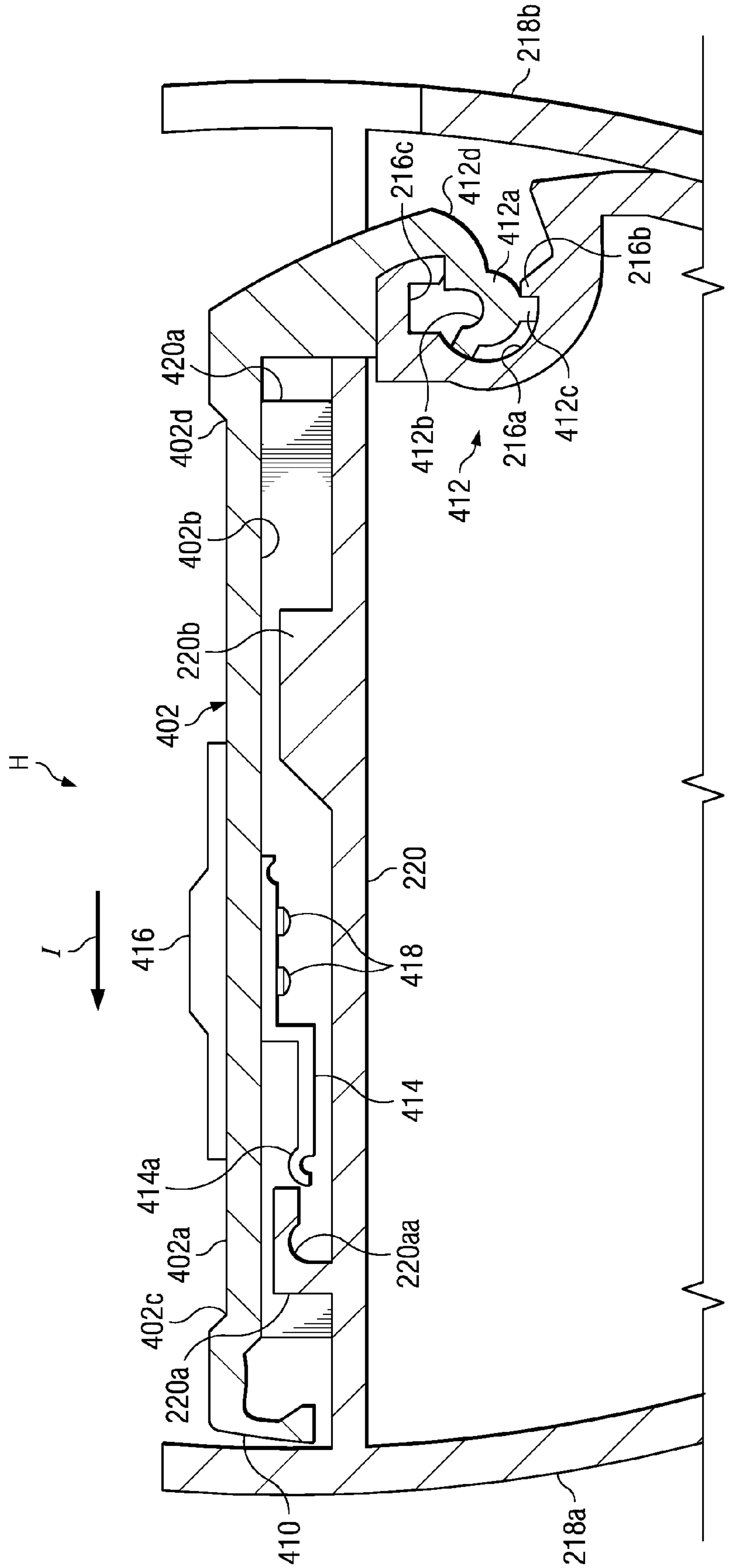
FIG. 4*m* is a cross sectional view illustrating an exemplary embodiment of the door of FIG. 4*f* being secured to the lighting device chassis of FIG. 2*c*.
Figure 4N:
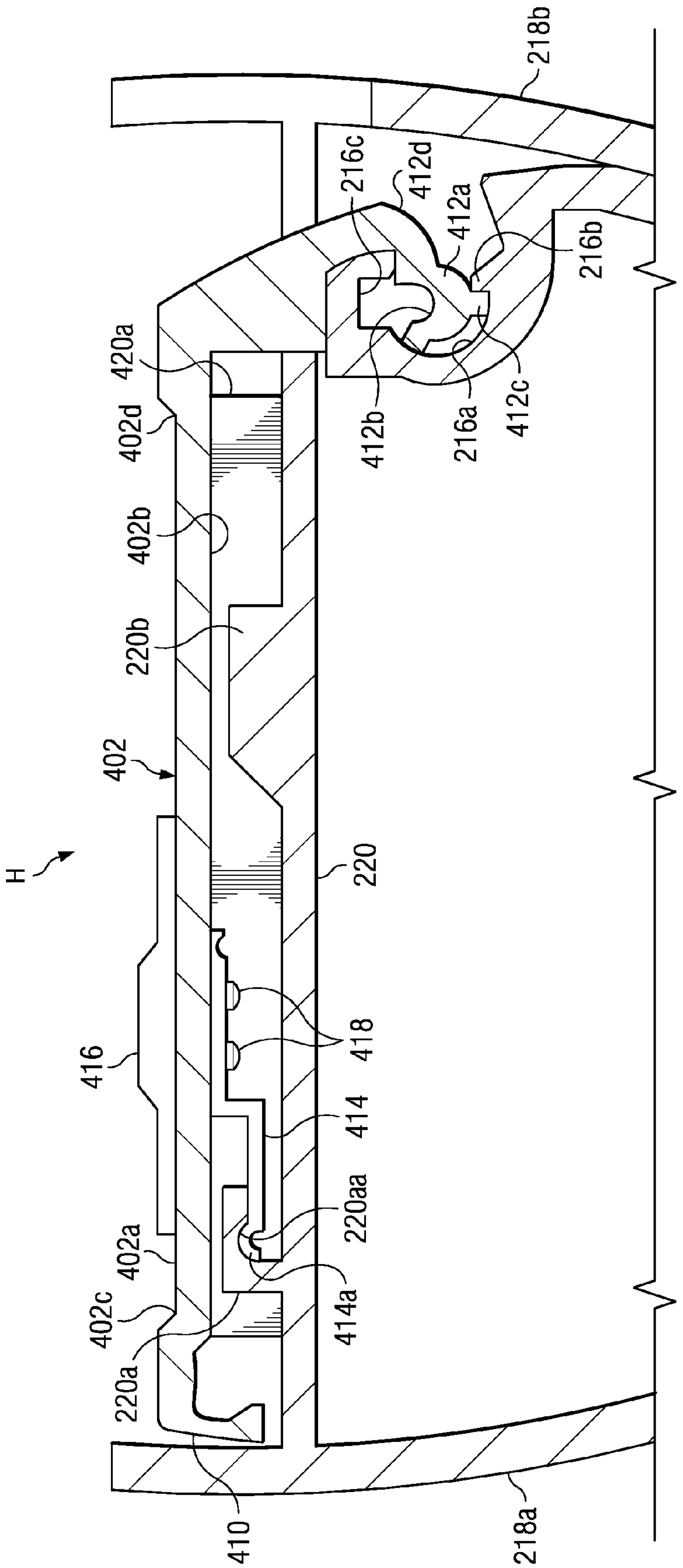
FIG. 4*n* is a cross sectional view illustrating an exemplary embodiment of the door of FIG. 4*f* secured to the lighting device chassis of FIG. 2*c*.

With the door 400 in the position H, the gasket 420 engages the chassis base 202 and the door supports 220 on the lighting device chassis 200, and the latches 414 on the door 400 are positioned adjacent the door securing members 220*a* on the lighting device chassis 200, as illustrated in FIG. 4*m*. The door 400 may then be secured to the lighting device chassis 200 free of the use of a tool by applying a force to the top surface 402*a* of the base 402 on the door 400 in order to compress the gasket 420 such that the latches 414 may be moved by the latch actuators 416 in a direction I to position the arcuate distal ends 414*a* on the latches 414 in the securing channels 220*aa* on the lighting device chassis 200, illustrated in FIG. 4*n*. The compressing of the gasket 420 before positioning the arcuate distal ends 414*a* in the securing channels 220*aa* provides a tight seal between the door 400 and the lighting device chassis 200 upon the engagement of the latches 414 and the door securing members 220*a*. In an exemplary embodiment, the gasket 420 includes a compression/depression ratio such that a liquid tight seal is provided between the door 400 and the lighting device chassis 200 while still allowing engagement of the latches 414 and the door securing members 220*a*. Furthermore, upon release of the latches 414 from the door securing members 220*a*, the gasket 420 is allowed to expand, which pushes the door 400 away from the lighting device chassis 200 in order to allow access to the front edge 402*c* of the door 400 such that the door 400 may be opened.

Referring now to FIGS. 1, 5*a*, 5*b*, and 5*c*, the chassis support member 500 is illustrated. The chassis support member 500 includes a support arm 502 that extends from the chassis support member 500 and includes a distal end 502*a*. A conical rotational coupling member passageway 504 is defined by the support arm 502 and located adjacent the distal end 502*a* of the support arm 502. A support arm stop beam 506 extends from the support arm 502 and into the rotational coupling member passageway 504.

Figure 5A:
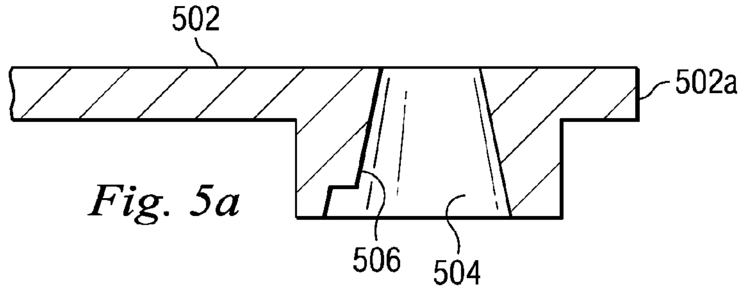
FIG. 5*a* is a cross sectional view illustrating an exemplary embodiment of a support arm used in the lighting apparatus of FIG. 1.
Figure 5B:
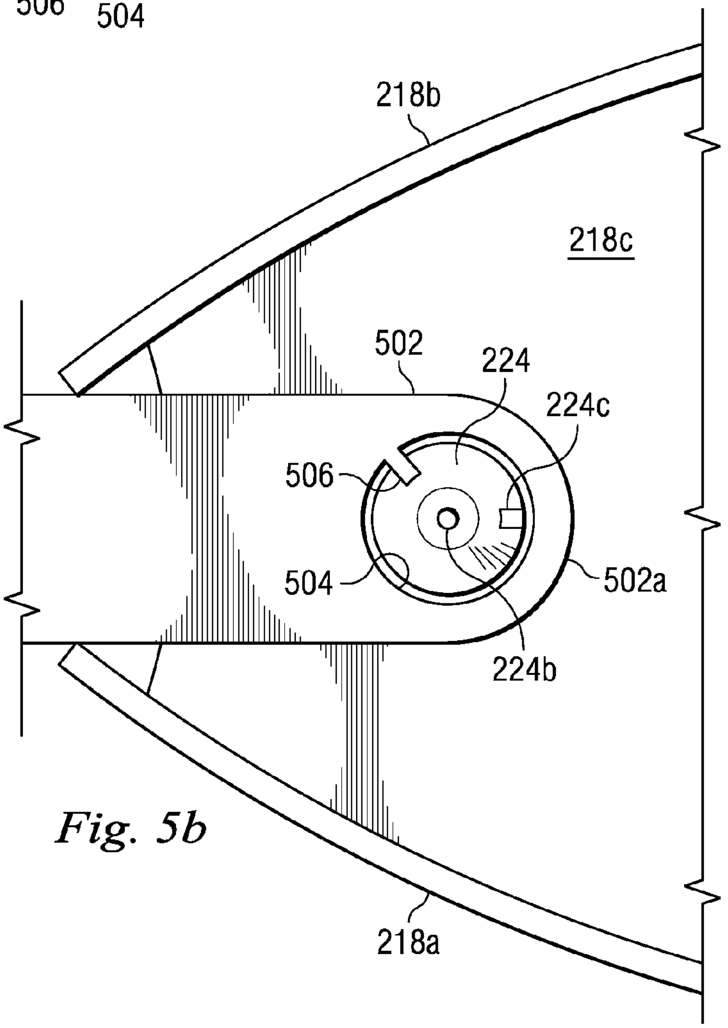
FIG. 5*b* is a side view illustrating an exemplary embodiment of the support arm of FIG. 5*a* coupled to the lighting device chassis of FIG. 2*c*.
Figure 5C:
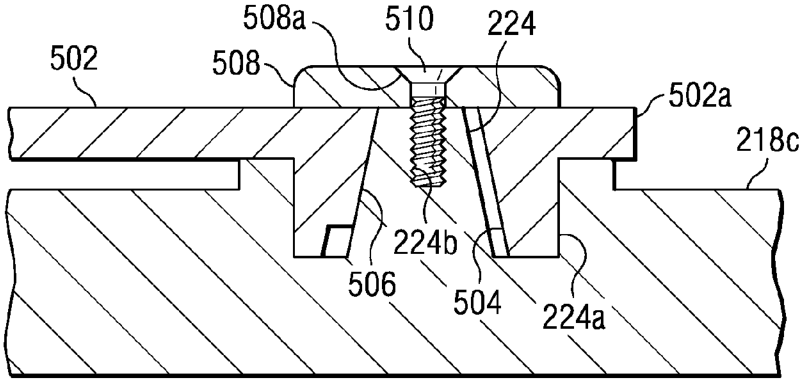
FIG. 5*c* is a cross sectional view illustrating an exemplary embodiment of the support arm and the lighting device chassis of FIG. 5*b*.

The chassis support member 500 is coupled to the lighting device chassis 200 by positioning the rotational coupling member 224 on lighting device chassis 200 in the rotational coupling member passageway 504, illustrated in FIGS. 5*b* and 5*c*. A cap 508 defining a coupling aperture 508*a* is then placed on the support arm 502 such that the coupling aperture 508*a* is aligned with the fastener coupler 224*b* on the rotational coupling member 224. A fastener 510 is then positioned in the coupling aperture 508*a* and the fastener coupler 224*b*, illustrated in FIG. 5*c*. The lighting device chassis 200 is now coupled to the support arm 502 and the chassis support member 500 and may rotate about the rotational coupling of the rotational coupling member 224 and the support arm 502. However, due to the coupling member stop beam 224*c* on the rotational coupling member 224 and the support arm stop beam 506 on the chassis support member 500, the lighting device chassis 200 may not rotate beyond the point where the coupling member stop beam 224*c* engages the support arm stop beam 506. In an exemplary embodiment, the support arm stop beam 506 may be positioned such that the lighting device chassis 200 may not rotate beyond a predetermined point such as, for example, the point where the lighting device chassis 200 would be directing light at the chassis support member 500 or on a wall that the chassis support member 500 is coupled to. Furthermore, the coupling member stop beam 224*c* and the support arm stop beam 506 will not allow rotation of the lighting device chassis 200 for more than 360 degrees in order to prevent binding of the cable 314*b*. Once the lighting device chassis 200 is rotated into the correct position, the fastener 510 may be tightened in order to engage a surface on the support arm 502 adjacent the rotational coupling member passageway 504 with a surface on the rotational coupling member 224 in order to prevent rotation of the lighting device chassis 200 relative to the support arm 502. In an exemplary embodiment, the cap 508 includes a plurality of notches 508*b* that may be aligned with a reference point on the lighting device chassis 200 in order to angularly position the lighting device chassis 200 relative to the chassis support member 500.

In operation, the lighting apparatus 100 provides a lamp 314*a* that is positioned in the lighting device housing 206 such that the lighting device chassis 200 may be rotated relative to the chassis support member 500 further than a conventional lighting apparatus without the lamp 314*a* being seen.

Figure 6A:
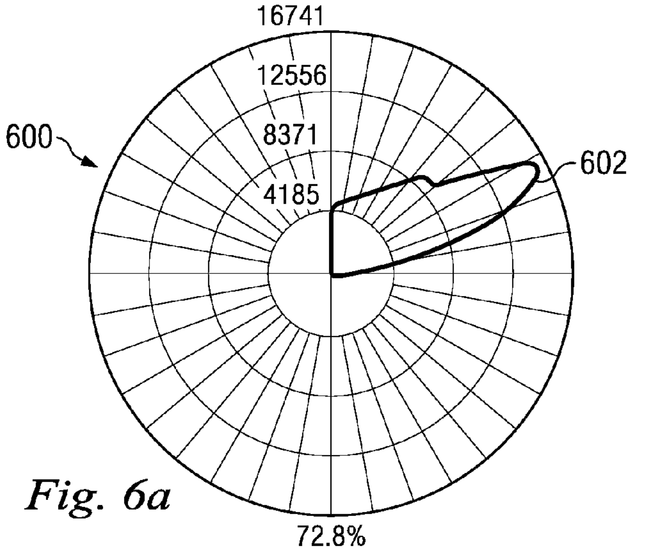
FIG. 6*a* is a graph illustrating an exemplary experimental embodiment of the operation of the lighting apparatus of FIG. 1.

Referring now to FIG. 6*a*, in an exemplary experimental embodiment 600, a 400 Watt metal halide light was used for the lamp 314*a* and the lens 422 was clear. A candela plot 602 was generated when power was supplied to the lamp 314*a*. The lighting apparatus 100 of exemplary experimental embodiment 600 had a total rated lamp lumens of 33000, a total luminaire efficiency of 72.6%, a spacing criteria of 0.92 for angles between 1 degree and 180 degrees, a spacing criteria of 1.68 for angles between 90 degrees and 270 degrees, a spacing criteria of 1.28 for the diagonal, a luminous length of 0.53 feet for angles between 1 degree and 180 degrees, and a luminous width of 1.57 feet for angles between 90 degrees and 270 degrees. This was an unexpected result. The spacing criteria of 1.68 for angles between 90 degrees and 270 degrees provides a lateral distribution that is greater than conventional lighting apparatus which allows a plurality of lighting apparatus 100 to be spaced further apart than conventional lighting apparatus while providing the same amount of light.

The luminance data for experimental embodiment 604, in candelas per meter squared, was as follows:

| Angle In Degrees | Average 0-Deg | Average 45-Deg | Average 90-Deg |
|---|---|---|---|
| 45 | 87699 | 117272 | 187172 |
| 55 | 33563 | 149419 | 115205 |
| 65 | 5268 | 34164 | 96371 |
| 75 | 1442 | 5022 | 49371 |
| 85 | 2067 | 2067 | 14912 |

The candela tabulation for the candela plot 606 was as follows:

| | 0 | 22.5 | 45 | 67.5 | 90 | 112.5 | 135 | 157.5 | 180 | 202.5 |
|---|---|---|---|---|---|---|---|---|---|---|
| 0 | 9401 | 9401 | 9401 | 9401 | 9401 | 9401 | 9401 | 9401 | 9401 | 9401 |
| 2.5 | 9206 | 9134 | 9163 | 9263 | 9422 | 9695 | 10054 | 10270 | 10544 | 10285 |
| 5 | 9378 | 9321 | 9335 | 9292 | 9494 | 10040 | 10975 | 11608 | 11852 | 11579 |
| 7.5 | 9220 | 9422 | 9695 | 9407 | 9580 | 10587 | 12155 | 13133 | 13521 | 13090 |
| 10 | 8501 | 8702 | 9393 | 9767 | 9623 | 11234 | 13478 | 14701 | 15175 | 14614 |
| 12.5 | 7954 | 8228 | 8875 | 10069 | 9695 | 12011 | 14844 | 16053 | 16182 | 15995 |
| 15 | 7523 | 7882 | 8573 | 10011 | 9767 | 13003 | 16254 | 16297 | 15779 | 16211 |
| 17.5 | 7178 | 7652 | 8285 | 9479 | 9867 | 13866 | 17131 | 15679 | 14499 | 15592 |
| 20 | 6775 | 7350 | 8084 | 9004 | 9939 | 14873 | 17462 | 14427 | 12744 | 14327 |
| 22.5 | 6430 | 6991 | 7782 | 8674 | 10011 | 15966 | 17203 | 12500 | 10198 | 12399 |
| 25 | 6156 | 6660 | 7494 | 8357 | 10069 | 17117 | 16556 | 10313 | 7940 | 10198 |
| 27.5 | 5826 | 6343 | 7322 | 8026 | 10069 | 18196 | 15607 | 8386 | 6099 | 8285 |
| 30 | 5538 | 5984 | 7091 | 7724 | 10040 | 18973 | 14024 | 6689 | 4718 | 6588 |
| 32.5 | 5293 | 5667 | 6991 | 7322 | 10069 | 19275 | 12183 | 5221 | 3395 | 5106 |
| 35 | 5135 | 5408 | 6919 | 7365 | 10155 | 18987 | 10098 | 4028 | 2532 | 3898 |
| 37.5 | 5063 | 5207 | 6761 | 7293 | 10213 | 18124 | 8069 | 3093 | 1942 | 2949 |
| 40 | 5006 | 5121 | 6602 | 7178 | 10385 | 17160 | 6185 | 2345 | 1438 | 2244 |
| 42.5 | 4963 | 5063 | 6444 | 7091 | 10472 | 15808 | 4675 | 1755 | 1064 | 1683 |
| 45 | 4819 | 5020 | 6444 | 6933 | 10285 | 13392 | 3524 | 1295 | 777 | 1237 |
| 47.5 | 4617 | 4862 | 6401 | 6919 | 9738 | 10687 | 2503 | 978 | 575 | 906 |
| 50 | 4286 | 4574 | 6487 | 6904 | 8659 | 7954 | 1726 | 705 | 417 | 662 |
| 52.5 | 3093 | 4229 | 6588 | 5768 | 6099 | 5998 | 1179 | 518 | 331 | 503 |
| 55 | 1496 | 3165 | 6660 | 4531 | 5135 | 4085 | 820 | 388 | 245 | 374 |
| 57.5 | 647 | 1539 | 6271 | 2949 | 4430 | 2517 | 575 | 288 | 201 | 288 |
| 60 | 345 | 762 | 5624 | 2445 | 4056 | 1438 | 403 | 230 | 173 | 230 |
| 62.5 | 259 | 417 | 2920 | 2215 | 3812 | 1036 | 288 | 173 | 144 | 187 |
| 65 | 173 | 288 | 1122 | 1971 | 3165 | 734 | 216 | 158 | 129 | 158 |
| 67.5 | 129 | 173 | 374 | 1712 | 2258 | 532 | 173 | 129 | 115 | 144 |
| 70 | 86 | 115 | 245 | 1510 | 1812 | 388 | 144 | 115 | 101 | 129 |
| 72.5 | 58 | 72 | 158 | 978 | 1151 | 273 | 129 | 115 | 86 | 115 |
| 75 | 29 | 43 | 101 | 518 | 993 | 173 | 115 | 101 | 86 | 115 |
| 77.5 | 14 | 29 | 58 | 245 | 705 | 115 | 101 | 101 | 86 | 101 |

-continued

| | 0 | 22.5 | 45 | 67.5 | 90 | 112.5 | 135 | 157.5 | 180 | 202.5 |
|---|---|---|---|---|---|---|---|---|---|---|
| 80 | 14 | 29 | 29 | 115 | 432 | 101 | 86 | 86 | 72 | 86 |
| 82.5 | 14 | 14 | 29 | 58 | 230 | 86 | 72 | 72 | 72 | 86 |
| 85 | 14 | 14 | 14 | 29 | 101 | 72 | 58 | 72 | 72 | 72 |
| 87.5 | 0 | 14 | 14 | 29 | 29 | 43 | 43 | 58 | 43 | 58 |
| 90 | 0 | 0 | 0 | 0 | 0 | 0 | 0 | 0 | 0 | 0 |

and

| Vert. | Horizontal Angles | | | | | | |
|---|---|---|---|---|---|---|---|
| Angles | 225 | 247.5 | 270 | 292.5 | 315 | 337.5 | 360 |
| 0 | 9401 | 9401 | 9401 | 9401 | 9401 | 9401 | 9401 |
| 2.5 | 10170 | 9752 | 9450 | 9278 | 9148 | 9120 | 9206 |
| 5 | 11004 | 10155 | 9609 | 9321 | 9177 | 9177 | 9378 |
| 7.5 | 12212 | 10759 | 9738 | 9436 | 9364 | 9378 | 9220 |
| 10 | 13535 | 11407 | 9882 | 9494 | 9594 | 8918 | 8501 |
| 12.5 | 14902 | 12169 | 9896 | 9522 | 9206 | 8357 | 7954 |
| 15 | 16268 | 12974 | 9925 | 9652 | 8659 | 7983 | 7523 |
| 17.5 | 17103 | 13838 | 9939 | 9709 | 8113 | 7667 | 7178 |
| 20 | 17117 | 14672 | 9939 | 9479 | 7825 | 7264 | 6775 |
| 22.5 | 16628 | 15693 | 10026 | 9004 | 7537 | 6861 | 6430 |
| 25 | 15707 | 16686 | 10054 | 8630 | 7221 | 6502 | 6156 |
| 27.5 | 14427 | 17534 | 10026 | 8314 | 6847 | 6185 | 5826 |
| 30 | 12672 | 17937 | 10011 | 7998 | 6617 | 5854 | 5538 |
| 32.5 | 10918 | 17951 | 9997 | 7854 | 6502 | 5538 | 5293 |
| 35 | 9091 | 17793 | 10054 | 7652 | 6487 | 5265 | 5135 |
| 37.5 | 7192 | 17390 | 9983 | 7595 | 6458 | 5034 | 5063 |
| 40 | 5610 | 16743 | 9680 | 7393 | 6530 | 4919 | 5006 |
| 42.5 | 4229 | 16139 | 9335 | 7322 | 6617 | 4804 | 4963 |
| 45 | 3179 | 15592 | 8501 | 6458 | 6689 | 4689 | 4819 |
| 47.5 | 2388 | 13464 | 8098 | 5754 | 6775 | 4502 | 4617 |
| 50 | 1755 | 10903 | 8199 | 4991 | 6689 | 4330 | 4286 |
| 52.5 | 1295 | 8314 | 8645 | 3970 | 6617 | 4071 | 3093 |
| 55 | 949 | 6156 | 8256 | 4919 | 6574 | 3150 | 1496 |
| 57.5 | 690 | 4330 | 7264 | 5710 | 6329 | 1553 | 647 |
| 60 | 489 | 3049 | 6530 | 5423 | 5595 | 734 | 345 |
| 62.5 | 374 | 2086 | 5955 | 4963 | 3423 | 374 | 259 |
| 65 | 302 | 1424 | 5495 | 4488 | 1496 | 288 | 173 |
| 67.5 | 245 | 892 | 4847 | 4200 | 403 | 216 | 129 |
| 70 | 187 | 547 | 3956 | 3884 | 273 | 144 | 86 |
| 72.5 | 173 | 345 | 2992 | 2877 | 173 | 86 | 58 |
| 75 | 144 | 216 | 1784 | 1338 | 115 | 58 | 29 |
| 77.5 | 129 | 158 | 1021 | 288 | 72 | 29 | 14 |
| 80 | 115 | 129 | 575 | 115 | 43 | 29 | 14 |
| 82.5 | 101 | 101 | 259 | 72 | 29 | 14 | 14 |
| 85 | 72 | 86 | 86 | 43 | 29 | 14 | 14 |
| 87.5 | 58 | 58 | 43 | 29 | 14 | 14 | 0 |
| 90 | 0 | 0 | 0 | 0 | 0 | 0 | 0 |

The zonal lumen summary for experimental embodiment 604 was as follows:

| Zone | Lumens | % Lamp | % Fixt |
|---|---|---|---|
| 0–30 | 9019.74 | 27.3 | 37.6 |
| 0–40 | 14137.33 | 42.8 | 59 |
| 0–60 | 22036.11 | 66.8 | 92 |
| 0–90 | 23962.61 | 72.6 | 100 |
| 90–120 | 0 | 0 | 0 |
| 90–130 | 0 | 0 | 0 |
| 90–150 | 0 | 0 | 0 |
| 90–180 | 0 | 0 | 0 |
| 0–180 | 23962.61 | 72.6 | 100 |

Total Luminaire Efficience = 72.6% and

| Zone | Lumens |
|---|---|
| 0–10 | 997.61 |
| 10–20 | 3262.69 |
| 20–30 | 4759.44 |
| 30–40 | 5117.58 |
| 40–50 | 4724.15 |
| 50–60 | 3174.64 |
| 60–70 | 1422.88 |
| 70–80 | 440.16 |
| 80–90 | 63.47 |
| 90–100 | 0 |
| 100–110 | 0 |
| 110–120 | 0 |
| 120–130 | 0 |
| 130–140 | 0 |
| 140–150 | 0 |
| 150–160 | 0 |
| 160–170 | 0 |
| 170–180 | 0 |

The coefficients of utilitzation for experimental embodiment 604, using the zonal cavity method and with an effective floor cavity reflectance of 0.20, was as follows:

| | RC | | | | | | | | | | | | | | | | | |
|---|---|---|---|---|---|---|---|---|---|---|---|---|---|---|---|---|---|---|
| | 80 | | | | 70 | | | | 50 | | | 30 | | | 10 | | | 0 |
| | RW | | | | | | | | | | | | | | | | | |
| | 70 | 50 | 30 | 10 | 70 | 50 | 30 | 10 | 50 | 30 | 10 | 50 | 30 | 10 | 50 | 30 | 10 | 0 |
| 0 | 86 | 86 | 86 | 86 | 84 | 84 | 84 | 84 | 81 | 81 | 81 | 77 | 77 | 77 | 74 | 74 | 74 | 73 |
| 1 | 81 | 78 | 75 | 73 | 79 | 76 | 74 | 72 | 73 | 71 | 70 | 71 | 69 | 68 | 68 | 67 | 66 | 64 |
| 2 | 75 | 70 | 66 | 62 | 73 | 68 | 65 | 62 | 66 | 63 | 60 | 64 | 61 | 59 | 62 | 59 | 58 | 56 |
| 3 | 69 | 63 | 58 | 54 | 67 | 61 | 57 | 53 | 59 | 55 | 52 | 57 | 54 | 51 | 56 | 53 | 50 | 49 |
| 4 | 64 | 56 | 51 | 47 | 62 | 55 | 50 | 46 | 54 | 49 | 46 | 52 | 48 | 45 | 51 | 47 | 45 | 43 |
| 5 | 59 | 51 | 45 | 41 | 58 | 50 | 45 | 41 | 49 | 44 | 40 | 47 | 43 | 40 | 46 | 42 | 40 | 38 |

-continued

| | RC | | | | | | | | | | | | | | | | | |
|---|---|---|---|---|---|---|---|---|---|---|---|---|---|---|---|---|---|---|
| | 80 | | | | 70 | | | | 50 | | | 30 | | | 10 | | | 0 |
| | RW | | | | | | | | | | | | | | | | | |
| | 70 | 50 | 30 | 10 | 70 | 50 | 30 | 10 | 50 | 30 | 10 | 50 | 30 | 10 | 50 | 30 | 10 | 0 |
| 6 | 55 | 46 | 41 | 36 | 54 | 46 | 40 | 36 | 44 | 40 | 36 | 43 | 39 | 36 | 42 | 38 | 35 | 34 |
| 7 | 51 | 42 | 37 | 33 | 50 | 42 | 36 | 32 | 41 | 36 | 32 | 40 | 35 | 32 | 39 | 35 | 32 | 30 |
| 8 | 48 | 39 | 33 | 29 | 47 | 38 | 33 | 29 | 37 | 33 | 29 | 37 | 32 | 29 | 36 | 32 | 29 | 27 |
| 9 | 45 | 36 | 30 | 27 | 44 | 35 | 30 | 27 | 35 | 30 | 26 | 34 | 29 | 26 | 33 | 29 | 26 | 25 |
| 10 | 42 | 33 | 28 | 24 | 41 | 33 | 28 | 24 | 32 | 27 | 24 | 31 | 27 | 24 | 31 | 27 | 24 | 23 |

Figure 6B:
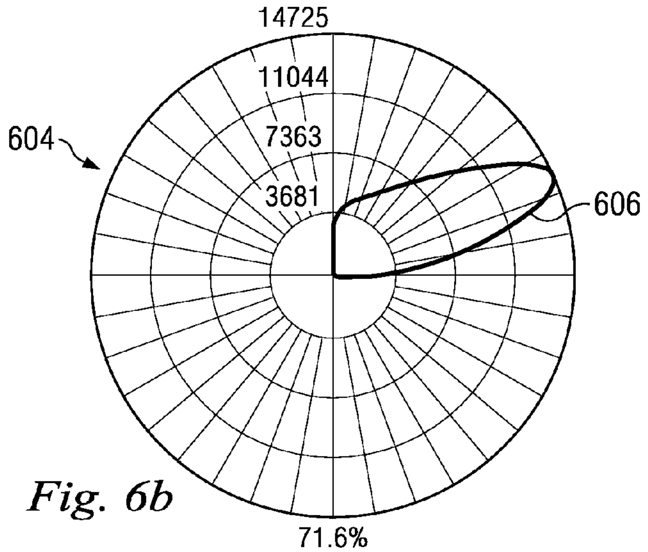
FIG. 6*b* is a graph illustrating an exemplary experimental embodiment of the operation of the lighting apparatus of FIG. 1.

Referring now to FIG. 6*b*, in an exemplary experimental embodiment 604, a 400 Watt metal halide light was used for the lamp 314*a* and the lens 422 was micro-prismatic. A candela plot 606 was generated when power was supplied to the lamp 314*a*. The lighting apparatus 100 of exemplary experimental embodiment 604 had a total rated lamp lumens of 33000, a total luminaire efficiency of 71.4%, a spacing criteria of 0.70 for angles between 1 degree and 180 degrees, a spacing criteria of 1.62 for angles between 90 degrees and 270 degrees, a spacing criteria of 1.28 for the diagonal, a luminous length of 0.53 feet for angles between 1 degree and 180 degrees, and a luminous width of 1.57 feet for angles between 90 degrees and 270 degrees. This was an unexpected result. The spacing criteria of 1.62 for angles between 90 degrees and 270 degrees provides a lateral distribution that is greater than conventional lighting apparatus which allows a plurality of lighting apparatus 100 to be spaced further apart than conventional lighting apparatus while providing the same amount of light.

The luminance data for experimental embodiment 604, in candelas per meter squared, was as follows:

| Angle In Degrees | Average 0-Deg | Average 45-Deg | Average 90-Deg |
|---|---|---|---|
| 45 | 67535 | 98418 | 161512 |
| 55 | 44848 | 91648 | 11010 |
| 65 | 21893 | 60015 | 74022 |
| 75 | 9994 | 32168 | 47184 |
| 85 | 4282 | 10631 | 19047 |

The candela tabulation for the candela plot 606 was as follows:

| | 0 | 22.5 | 45 | 67.5 | 90 | 112.5 | 135 | 157.5 | 180 | 202.5 |
|---|---|---|---|---|---|---|---|---|---|---|
| 0 | 10063 | 10063 | 10063 | 10063 | 10063 | 10063 | 10063 | 10063 | 10063 | 10063 |
| 2.5 | 9076 | 9206 | 9321 | 9709 | 10040 | 10385 | 10687 | 10860 | 11105 | 10961 |
| 5 | 8343 | 8530 | 8789 | 9378 | 10054 | 10731 | 11306 | 11680 | 11896 | 11781 |
| 7.5 | 7695 | 7882 | 8256 | 9091 | 10083 | 11033 | 11982 | 12572 | 12888 | 12672 |
| 10 | 7235 | 7379 | 7839 | 8846 | 10155 | 11435 | 12658 | 13449 | 13780 | 13535 |
| 12.5 | 6746 | 6948 | 7494 | 8630 | 10227 | 11896 | 13435 | 14154 | 14355 | 14211 |
| 15 | 6415 | 6545 | 7178 | 8415 | 10313 | 12442 | 14111 | 14585 | 14629 | 14585 |
| 17.5 | 6099 | 6257 | 6890 | 8256 | 10457 | 13046 | 14672 | 14629 | 14298 | 14557 |
| 20 | 5854 | 5998 | 6674 | 8156 | 10601 | 13665 | 14974 | 14197 | 13507 | 14010 |
| 22.5 | 5667 | 5782 | 6516 | 8084 | 10788 | 14255 | 15046 | 13219 | 12097 | 13075 |
| 25 | 5452 | 5595 | 6401 | 8041 | 10961 | 14729 | 14844 | 11852 | 10313 | 11665 |
| 27.5 | 5279 | 5423 | 6329 | 7998 | 11133 | 15118 | 14226 | 10428 | 8717 | 10026 |
| 30 | 5092 | 5250 | 6271 | 7954 | 11248 | 15348 | 13262 | 8746 | 6933 | 8343 |
| 32.5 | 4905 | 5078 | 6185 | 7897 | 11291 | 15348 | 11996 | 7135 | 5380 | 6761 |
| 35 | 4689 | 4891 | 6070 | 7782 | 11191 | 15089 | 10702 | 5667 | 4071 | 5351 |
| 37.5 | 4473 | 4704 | 5941 | 7523 | 10889 | 14528 | 9148 | 4402 | 3164 | 4128 |
| 40 | 4258 | 4531 | 5768 | 7163 | 10342 | 13679 | 7624 | 3380 | 2359 | 3280 |
| 42.5 | 3999 | 4315 | 5581 | 6761 | 9623 | 12716 | 6214 | 2575 | 1784 | 2503 |
| 45 | 3711 | 4071 | 5408 | 6329 | 8875 | 11435 | 5121 | 2028 | 1395 | 1913 |
| 47.5 | 3423 | 3797 | 5149 | 5782 | 7897 | 10054 | 4042 | 1568 | 1093 | 1525 |
| 50 | 3035 | 3495 | 4847 | 5193 | 6832 | 8760 | 3136 | 1208 | 849 | 1179 |
| 52.5 | 2560 | 3121 | 4502 | 4560 | 5826 | 7365 | 2431 | 993 | 690 | 949 |
| 55 | 1999 | 2618 | 4085 | 3884 | 4948 | 6084 | 1870 | 806 | 575 | 762 |
| 57.5 | 1553 | 2071 | 3582 | 3351 | 4186 | 4905 | 1453 | 662 | 489 | 633 |
| 60 | 1223 | 1625 | 3021 | 2834 | 3510 | 3898 | 1136 | 561 | 432 | 547 |
| 62.5 | 964 | 1280 | 2474 | 2373 | 2934 | 3078 | 892 | 489 | 374 | 475 |
| 65 | 719 | 1007 | 1971 | 1956 | 2431 | 2417 | 719 | 417 | 331 | 417 |
| 67.5 | 547 | 806 | 1525 | 1597 | 1956 | 1956 | 590 | 360 | 288 | 360 |
| 70 | 403 | 604 | 1179 | 1309 | 1597 | 1510 | 489 | 316 | 245 | 316 |
| 72.5 | 302 | 446 | 892 | 1021 | 1251 | 1136 | 403 | 259 | 216 | 273 |
| 75 | 201 | 316 | 647 | 762 | 949 | 863 | 316 | 216 | 187 | 230 |
| 77.5 | 129 | 201 | 432 | 547 | 662 | 619 | 230 | 173 | 144 | 187 |
| 80 | 86 | 129 | 273 | 374 | 460 | 403 | 173 | 129 | 115 | 144 |
| 82.5 | 43 | 72 | 158 | 230 | 273 | 230 | 115 | 101 | 86 | 115 |

-continued

| | 0 | 22.5 | 45 | 67.5 | 90 | 112.5 | 135 | 157.5 | 180 | 202.5 |
|---|---|---|---|---|---|---|---|---|---|---|
| 85 | 29 | 29 | 72 | 115 | 129 | 115 | 86 | 86 | 72 | 86 |
| 87.5 | 14 | 14 | 14 | 43 | 43 | 58 | 43 | 58 | 43 | 58 |
| 90 | 0 | 0 | 0 | 0 | 0 | 0 | 0 | 0 | 0 | 0 |

and

| Vert. Angles | Horizontal Angles | | | | | | |
|---|---|---|---|---|---|---|---|
| | 225 | 247.5 | 270 | 292.5 | 315 | 337.5 | 360 |
| 0 | 10063 | 10063 | 10063 | 10063 | 10063 | 10063 | 10063 |
| 2.5 | 10903 | 10515 | 10155 | 9724 | 9364 | 9163 | 9076 |
| 5 | 11450 | 10889 | 10227 | 9465 | 8832 | 8472 | 8343 |
| 7.5 | 12140 | 11234 | 10285 | 9220 | 8285 | 7854 | 7695 |
| 10 | 12903 | 11637 | 10357 | 8976 | 7897 | 7365 | 7235 |
| 12.5 | 13607 | 12068 | 10457 | 8746 | 7508 | 6933 | 6746 |
| 15 | 14125 | 12586 | 10558 | 8515 | 7178 | 6588 | 6415 |
| 17.5 | 14542 | 13061 | 10659 | 8314 | 6890 | 6300 | 6099 |
| 20 | 14701 | 13564 | 10831 | 8170 | 6674 | 6027 | 5854 |
| 22.5 | 14600 | 13981 | 11033 | 8084 | 6502 | 5826 | 5667 |
| 25 | 14168 | 14413 | 11191 | 8012 | 6401 | 5653 | 5452 |
| 27.5 | 13449 | 14715 | 11335 | 7954 | 6286 | 5466 | 5279 |
| 30 | 12529 | 14888 | 11407 | 7854 | 6200 | 5308 | 5092 |
| 32.5 | 11248 | 14902 | 11363 | 7724 | 6113 | 5135 | 4905 |
| 35 | 9810 | 14758 | 11205 | 7508 | 6041 | 4934 | 4689 |
| 37.5 | 8357 | 14470 | 10874 | 7206 | 5926 | 4732 | 4473 |
| 40 | 7106 | 13924 | 10357 | 6847 | 5797 | 4502 | 4258 |
| 42.5 | 5840 | 13118 | 9738 | 6458 | 5624 | 4272 | 3999 |
| 45 | 4689 | 12068 | 9163 | 5941 | 5437 | 4056 | 3711 |
| 47.5 | 3754 | 10946 | 8630 | 5437 | 5193 | 3797 | 3423 |
| 50 | 3049 | 9522 | 8113 | 4919 | 4876 | 3452 | 3035 |
| 52.5 | 2417 | 8113 | 7595 | 4617 | 4531 | 3136 | 2560 |
| 55 | 1913 | 6804 | 7019 | 4330 | 4128 | 2647 | 1999 |
| 57.5 | 1525 | 5610 | 6387 | 4013 | 3654 | 2129 | 1553 |
| 60 | 1223 | 4589 | 5696 | 3639 | 3164 | 1683 | 1223 |
| 62.5 | 993 | 3812 | 5006 | 3236 | 2675 | 1338 | 964 |
| 65 | 820 | 3064 | 4330 | 2805 | 2201 | 1050 | 719 |
| 67.5 | 676 | 2445 | 3711 | 2445 | 1812 | 849 | 547 |
| 70 | 561 | 1913 | 3035 | 2057 | 1410 | 647 | 403 |
| 72.5 | 460 | 1510 | 2402 | 1683 | 1079 | 475 | 302 |
| 75 | 374 | 1122 | 1827 | 1352 | 791 | 360 | 201 |
| 77.5 | 273 | 806 | 1280 | 1007 | 532 | 230 | 129 |
| 80 | 201 | 532 | 863 | 676 | 345 | 144 | 86 |
| 82.5 | 144 | 331 | 503 | 403 | 187 | 72 | 43 |
| 85 | 101 | 173 | 230 | 187 | 86 | 43 | 29 |
| 87.5 | 58 | 58 | 72 | 58 | 29 | 14 | 14 |
| 90 | 0 | 0 | 0 | 0 | 0 | 0 | 0 |

The zonal lumen summary for experimental embodiment 604 was as follows:

| Zone | Lumens | % Lamp | % Fixt |
|---|---|---|---|
| 0–30 | 8525.99 | 25.8 | 36.2 |
| 0–40 | 13577.78 | 41.1 | 57.6 |
| 0–60 | 21049.5 | 63.8 | 89.3 |
| 0–90 | 23577.69 | 71.4 | 100 |
| 90–120 | 0 | 0 | 0 |
| 90–130 | 0 | 0 | 0 |
| 90–150 | 0 | 0 | 0 |
| 90–180 | 0 | 0 | 0 |
| 0–180 | 23577.69 | 71.4 | 100 |

Total Luminaire Efficiency = 71.4% and

| Zone | Lumens |
|---|---|
| 0–10 | 972.53 |
| 10–20 | 2977.05 |
| 20–30 | 4576.41 |
| 30–40 | 5051.79 |
| 40–50 | 4410.09 |
| 50–60 | 3061.63 |
| 60–70 | 1684.64 |
| 70–80 | 709.24 |
| 80–90 | 134.3 |
| 90–100 | 0 |
| 100–110 | 0 |
| 110–120 | 0 |
| 120–130 | 0 |
| 130–140 | 0 |
| 140–150 | 0 |
| 150–160 | 0 |
| 160–170 | 0 |
| 170–180 | 0 |

The coefficients of utilitzation for experimental embodiment 604, using the zonal cavity method and with an effective floor cavity reflectance of 0.20, was as follows:

| | RC | | | | | | | | | | | | | | | | | |
|---|---|---|---|---|---|---|---|---|---|---|---|---|---|---|---|---|---|---|
| | 80 | | | | 70 | | | | 50 | | | 30 | | | 10 | | | 0 |
| | RW | | | | | | | | | | | | | | | | | |
| | 70 | 50 | 30 | 10 | 70 | 50 | 30 | 10 | 50 | 30 | 10 | 50 | 30 | 10 | 50 | 30 | 10 | 0 |
| 0 | 85 | 85 | 85 | 85 | 83 | 83 | 83 | 83 | 79 | 79 | 79 | 76 | 76 | 76 | 73 | 73 | 73 | 71 |
| 1 | 79 | 76 | 74 | 71 | 77 | 75 | 72 | 70 | 72 | 70 | 68 | 69 | 67 | 66 | 66 | 65 | 64 | 63 |
| 2 | 73 | 68 | 64 | 60 | 71 | 67 | 63 | 60 | 64 | 61 | 58 | 62 | 59 | 57 | 60 | 58 | 56 | 54 |
| 3 | 67 | 61 | 56 | 52 | 66 | 60 | 55 | 51 | 58 | 54 | 50 | 56 | 52 | 49 | 54 | 51 | 49 | 47 |
| 4 | 62 | 55 | 49 | 45 | 61 | 54 | 48 | 44 | 52 | 47 | 44 | 50 | 46 | 43 | 49 | 46 | 43 | 41 |
| 5 | 58 | 49 | 44 | 39 | 56 | 49 | 43 | 39 | 47 | 42 | 39 | 46 | 42 | 38 | 44 | 41 | 38 | 36 |
| 6 | 53 | 45 | 39 | 35 | 52 | 44 | 39 | 35 | 43 | 38 | 34 | 42 | 37 | 34 | 41 | 37 | 34 | 32 |

-continued

| | RC | | | | | | | | | | | | | | | | | |
|---|---|---|---|---|---|---|---|---|---|---|---|---|---|---|---|---|---|---|
| | 80 | | | | 70 | | | | 50 | | | 30 | | | 10 | | | 0 |
| | RW | | | | | | | | | | | | | | | | | |
| | 70 | 50 | 30 | 10 | 70 | 50 | 30 | 10 | 50 | 30 | 10 | 50 | 30 | 10 | 50 | 30 | 10 | 0 |
| 7 | 50 | 41 | 35 | 31 | 49 | 40 | 35 | 31 | 39 | 34 | 31 | 38 | 34 | 31 | 37 | 33 | 30 | 29 |
| 8 | 47 | 38 | 32 | 28 | 45 | 37 | 32 | 28 | 36 | 31 | 28 | 35 | 31 | 28 | 34 | 30 | 27 | 26 |
| 9 | 44 | 35 | 29 | 25 | 43 | 34 | 29 | 25 | 33 | 29 | 25 | 33 | 28 | 25 | 32 | 28 | 25 | 24 |
| 10 | 41 | 32 | 27 | 23 | 40 | 32 | 27 | 23 | 31 | 26 | 23 | 30 | 26 | 23 | 30 | 26 | 23 | 22 |

Figure 6C:
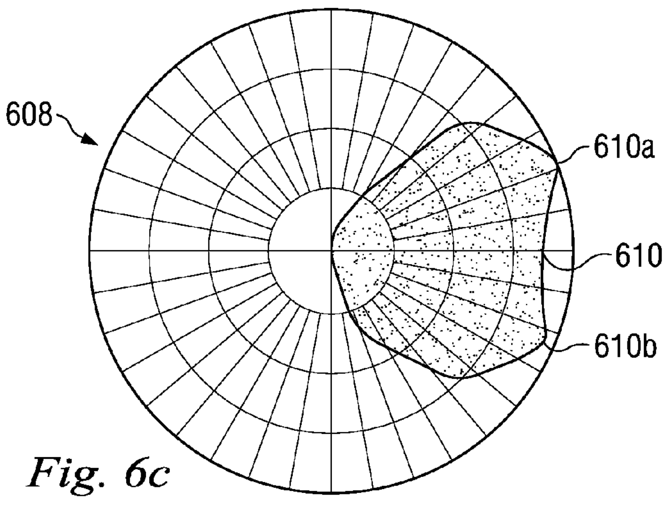
FIG. 6*c* is a graph illustrating an exemplary experimental embodiment of the operation of the lighting apparatus of FIG. 1.

Referring now to FIG. 6*c*, in an exemplary experimental embodiment 608, a 400 Watt metal halide light was used for the lamp 314*a*. A candela plot 610 was generated when power was supplied to the lamp 314*a*. The lighting apparatus 100 of exemplary experimental embodiment 608 included a plot with a pair of peaks 610*a* and 610*b*. This was an unexpected result. The peaks 610*a* and 610*b* allow a plurality of lighting apparatus 100 to be spaced further apart than a plurality of conventional lighting apparatus while providing an equal amount of light.

Referring now to FIGS. 7*a*, 7*b*, 7*c*, and 7*d*, in an alternative embodiment, a louver member 700 is coupled to the door 400. The louver member 700 includes a first support beam 702 that is held in a substantially parallel and spaced apart orientation from a second support beam 704 by a plurality of louvers 706. The first support beam 702 includes a pair of opposing ends 702*a* and 702*b* and defines a first chassis channel 702*c* that runs along the length of the first support beam 702 from the end 702*a* to the end 702*b*. A first clip coupling member 702*d* extends from the first support beam 702 adjacent the end 702*a* and defines an chassis edge channel 702*da*. A first clip coupling member 702*e* extends from the first support beam 702 adjacent the end 702*b* and defines an chassis edge channel 702*ea*. The second support beam 704 includes a pair of opposing ends 704*a* and 704*b* and defines a second chassis channel 704*c* that runs along the length of the second support beam 704 from the end 704*a* to the end 704*b*. A fastener coupler 704*d* is defined by the second support member 704 and located adjacent the end 704*a* of the second support member 704. A fastener coupler 704*e* is defined by the second support member 704 and located adjacent the end 704*b* of the second support member 704. A pair of coupling devices 708 are operable to couple to the second support member 704. Each coupling device 708 includes a second clip coupling member 708*a* that defines a chassis edge channel 708*b*. A fastener coupler 708*c* is defined by each coupling device 708 and located adjacent the second clip coupling member 708*a*.

Figure 7A:
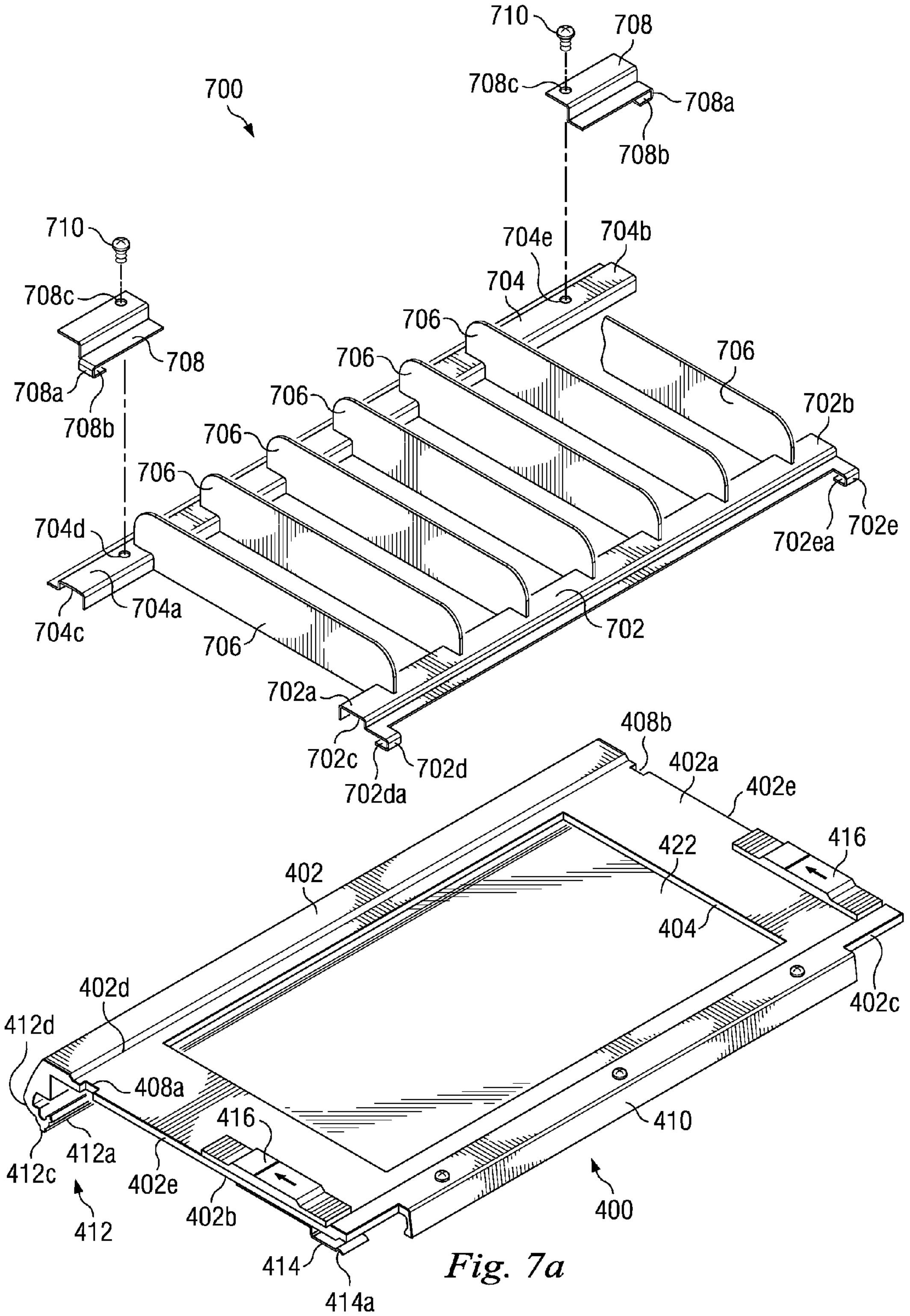
FIG. 7*a* is an exploded view illustrating an exemplary embodiment of a louver member being coupled to the door of FIG. 4*a*.
Figure 7B:
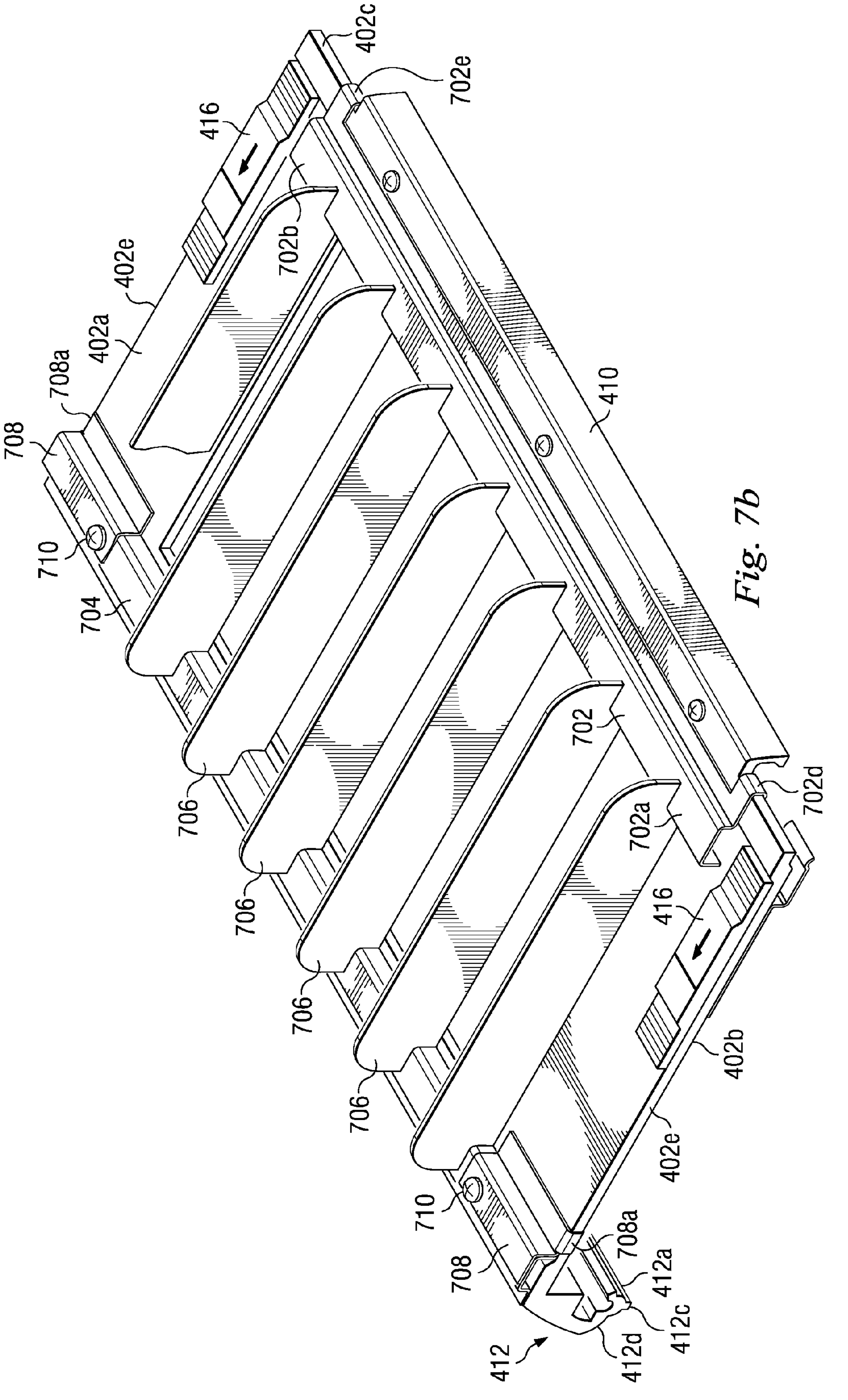
FIG. 7*b* is an perspective view illustrating an exemplary embodiment of the louver member of FIG. 7*a* coupled to the door of FIG. 4*a*.
Figure 7C:
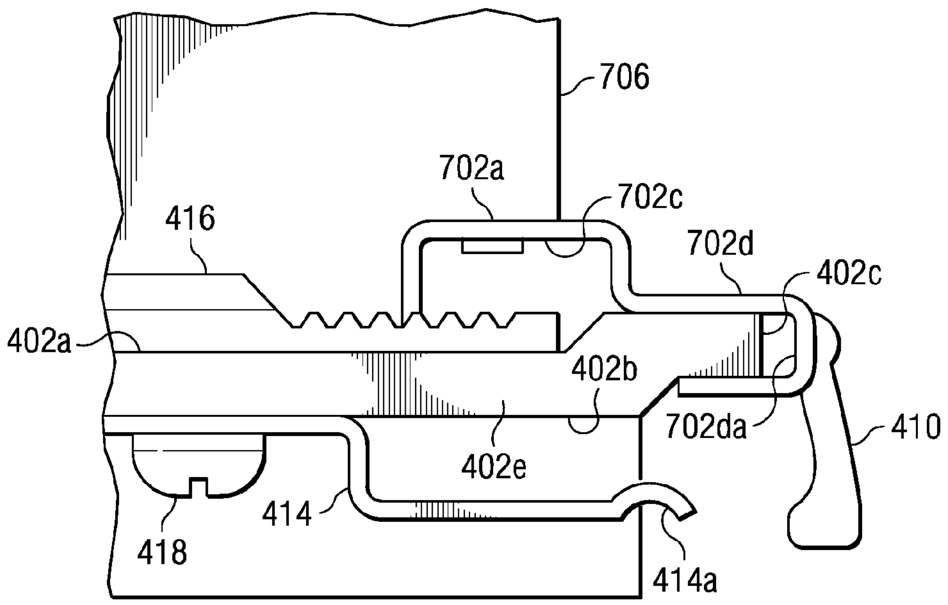
FIG. 7*c* is a side view illustrating an exemplary embodiment of a coupling member coupling the louver member of FIG. 7*a* to the door of FIG. 4*a*.
Figure 7D:
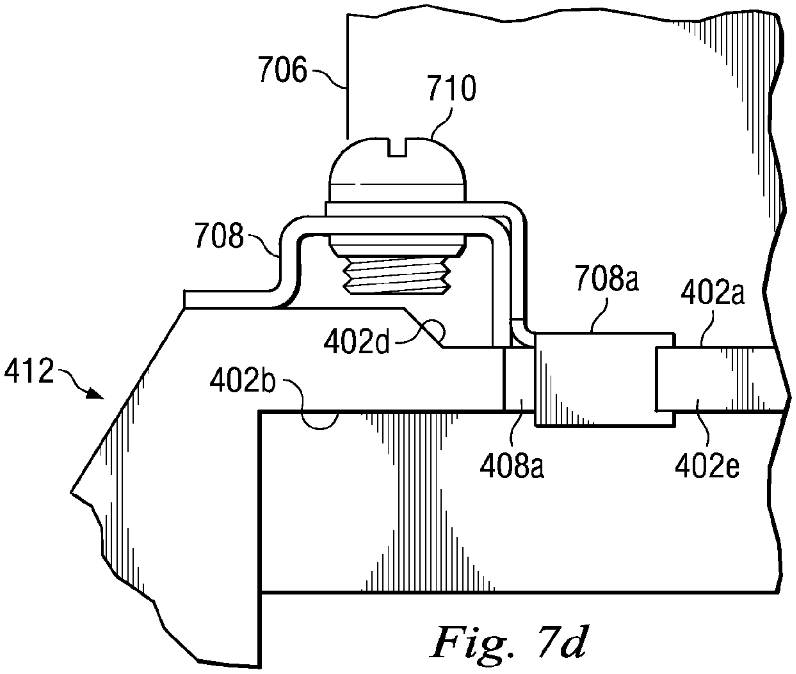
FIG. 7*d* is a side view illustrating an exemplary embodiment of a coupling member coupling the louver member of FIG. 7*a* to the door of FIG. 4*a*.

The louver member 700 is coupled to the door 400 by positioning the front edge 402*c* of the base 402 on door 400 in the chassis edge channels 702*da* and 702*ea* on the first coupling members 702*d* and 702*e*, illustrated in FIGS. 7*b* and 7*c*. With the front edge 402*c* of the base 402 on door 400 in the chassis edge channels 702*da* and 702*ea*, the base 402 becomes partially located in the first chassis channel 702*c* and the second chassis channel 704*c*. One of the coupling devices 708 is then positioned on the second support beam 704 such that the second clip coupling member 708*a* is positioned in the louver channel 408*a* on the base 402 of door 400 with the base 402 of the door 400 positioned in the chassis edge channel 708*b*, illustrated in FIGS. 7*b* and 7*d*. One of the coupling devices 708 is then positioned on the second support beam 704 such that the second coupling member 708*a* is positioned in the louver channel 408*b* on the base 402 of door 400 with the base 402 of the door 400 positioned in the chassis edge channel 708*b*, illustrated in FIG. 7*b*. A pair of fasteners 710 are then positioned in the fasteners couplers 708*c* on the coupling devices 708 and in the fastener couplers 704*d* and 704*e* on the second support beam 704 in order to couple the coupling devices 708 to the louver member 700 such that the louver member 700 is coupled to the base 402 of the door 400. Thus, an apparatus is provided that allows the louver member 700 to be coupled to the door 400 without modification to the door 400 such as, for example, drilling threaded channels in the door 400 in order to couple the louver member 700 to the door 400. In an exemplary embodiment, the height and spacing of the louvers 706 determines the cutoff angle of the lighting apparatus 100.

A lighting apparatus has been described that includes a lighting device chassis defining a lighting device housing, a reflector member located in the lighting device housing and comprising a first arcuate reflector surface and a second arcuate reflector surface, a lighting device extending from a side wall of the reflector member and positioned adjacent the first arcuate reflector surface and the second arcuate reflector surface, a door coupled to the lighting device chassis, wherein the door is operable to couple to, decouple from, and be secured to the lighting device chassis without the use of a tool, a gasket and a lens coupled to the door, whereby the gasket is operable to prevent light from escaping the lens through a perimeter surface of the lens, and a support member coupled to the lighting device chassis, whereby the support member is operable to prevent the lighting device chassis from rotating with respect to the support member.

A lighting apparatus has been described that includes means for housing a means for reflecting light, means for reflecting light housed in the means for housing a means for reflecting light, means for providing light located in the means for reflecting light, a door coupled to the means for housing a means for reflecting light, wherein the door comprises means for allowing the door to couple to, decouple from, and be secured to the means for housing a means for reflecting light without the use of a tool, means for sealing the door to the means for housing a means for reflecting light, whereby the means for sealing comprises means for preventing light from escaping a perimeter surface of a lens, and means for supporting the means for housing a means for reflecting light, whereby the means for supporting comprises means for preventing the means for housing a means for reflecting light from rotating with respect to the means for supporting the means for housing a means for reflecting light.

A method for providing light has been described that includes providing a lighting device housing that houses a reflector member and a lighting device, whereby the lighting device housing is coupled to a support member, coupling a door to the lighting device housing without the use of a tool, securing the door to the lighting device housing without the use of a tool, providing a seal between the door and the lighting device chassis with a gasket, rotating the lighting device housing relative to the support member, preventing the lighting device housing from rotating relative to the support member by engaging the support member and the lighting device housing, and providing light with the lighting device through a lens positioned in the door, whereby the gasket prevent light from escaping from a perimeter surface of the lens.

A lighting apparatus has been described that includes a lighting device chassis defining a lighting device housing and comprising a rotational coupling member, a reflector member located in the lighting device housing, the reflector member comprising a side wall, a first arcuate reflector surface extending from the side wall and comprising a first surface finish and a first reflector edge, a second arcuate reflector surface extending from the side wall and comprising a second surface finish and a second reflector edge, whereby the second arcuate reflector surface is positioned adjacent the first arcuate reflector surface such that the second reflector edge is located in a spaced apart orientation from the first reflector edge; and a lighting device support member extending from the side wall, a lighting device coupled to the lighting device support member and positioned by the lighting device support member adjacent the first arcuate reflector surface and the second arcuate reflector surface, a door coupled to the lighting device chassis, wherein the door is operable to couple to, decouple from, and be secured to the lighting device chassis without the use of a tool, whereby the door comprises a latch moveably coupled to the door, whereby the latch is operable to move into engagement with the lighting device chassis to secure the door to the lighting device chassis, a chassis coupling member extending along a length of the door, a coupling channel defined by the chassis coupling member, and a stop member extending from the chassis coupling member, a gasket and a lens coupled to the door, wherein the gasket is operable to prevent light from escaping the lens through a perimeter surface of the lens, whereby the gasket includes a first light passageway defined by the gasket, and a lens mounting channel defined by the gasket, located adjacent a perimeter of the first light passageway, and comprising a first channel surface and a second channel surface, whereby the lens is located in the lens mounting channel, a support member coupled to the lighting device chassis, whereby the support member comprises a rotational coupling member passageway defined by the support arm, whereby the rotational coupling member is positioned in the rotational coupling member passageway, and a support arm stop beam extending from the support arm and into the rotational coupling member passageway, a louver member, at least one first coupling member extending from the louver member, and at least one second coupling member that is operable to couple to the louver member and engage the door in order to couple the louver member to the door.

A lighting apparatus has been described that includes a reflector member, comprising a side wall, a reflector surface extending from the side wall, a lighting device support member extending from the side wall, and a lighting device coupled to the lighting device support member and positioned by the lighting device support member adjacent the reflector surface. In an exemplary embodiment, a mounting aperture is defined by the side wall, wherein the lighting device support member extends through the mounting aperture. In an exemplary embodiment, a first bracket is secured to the side wall and coupled to the lighting device support member, and a second bracket is secured to the lighting device and coupled to the lighting device support member. In an exemplary embodiment, the lighting device support member defines at least one support channel. In an exemplary embodiment, the first bracket includes a support arm positioned in the at least one support channel. In an exemplary embodiment, the second bracket includes a support arm positioned in the at least one support channel. In an exemplary embodiment, the lighting device support member provides a heat sink for the lighting device. In an exemplary embodiment, the lighting device support member comprises dimensions such that the lighting device is positioned at approximately the center of the reflector member.

A lighting apparatus has been described that includes means for reflecting light, including means for supporting a means for reflecting light, means for reflecting light extending from the means for supporting a means for reflecting light, means for supporting a means for providing light extending from the means for supporting a means for reflecting light, and means for providing light coupled to the means for supporting a means for providing light and positioned by the means for supporting a means for providing light adjacent the means for reflecting light. In an exemplary embodiment, the apparatus further includes means for allowing the means for supporting a means for providing light to extend through the means for supporting a means for reflecting light. In an exemplary embodiment, the apparatus further includes means for securing the means for supporting a means for providing light to the means for supporting a means for reflecting light, and means for securing the means for providing light to the means for supporting a means for providing light. In an exemplary embodiment, the means for supporting a means for providing light provides a means for dissipating heat from the means for providing light. In an exemplary embodiment, the means for supporting a means for providing light comprises dimensions such that the means for providing light is positioned at approximately the center of the means for reflecting light.

A method for reflecting light has been described that includes providing a reflector member comprising a side wall and a reflector surface extending from the side wall, positioning a lighting device adjacent the reflector surface by coupling the lighting device to a lighting device support member and extending the lighting device support member from the side wall, activating the lighting device, and reflecting light from the lighting device from the reflector surface. In an exemplary embodiment, the positioning comprises positioning the lighting device at approximately the center of the reflector member. In an exemplary embodiment, the method further comprises preventing rotation of the lighting device with the coupling of the lighting device to the lighting device support member. In an exemplary embodiment, the method further comprises dissipating heat from the lighting device with the lighting device support member.

A lighting apparatus has been described that includes a reflector member, including a side wall defining a mounting aperture, a reflector surface extending from the side wall, a lighting device support member extending from the side wall through the mounting aperture and defining at least one support channel, a first bracket secured to the side wall and coupled to the lighting device support member, wherein the first bracket includes a support arm positioned in the at least one support channel, a lighting device coupled to the lighting device support member and positioned by the lighting device support member adjacent the reflector surface, wherein the lighting device support member comprises dimensions such that the lighting device is positioned at approximately the center of the reflector member, and a second bracket secured to the lighting device and coupled to the lighting device support member, wherein the second bracket includes a support arm positioned in the at least one support channel.

A lighting apparatus has been described that includes means for reflecting light, including means for supporting a means for reflecting light, means for reflecting light extending from the means for supporting a means for reflecting light, means for supporting a means for providing light extending from the means for supporting a means for reflecting light, means for securing the means for supporting a means for providing light to the means for supporting a means for reflecting light, means for allowing the means for supporting a means for providing light to extend through the means for supporting a means for reflecting light, and means for providing light coupled to the means for supporting a means for providing light and positioned by the means for supporting a means for providing light adjacent the means for reflecting light, wherein the means for supporting a means for providing light comprises dimensions such that the means for providing light is positioned at approximately the center of the means for reflecting light, means for securing the means for providing light to the means for supporting a means for providing light.

A method for reflecting light has been described that includes providing a reflector member comprising a side wall and a reflector surface extending from the side wall, positioning a lighting device adjacent the reflector surface by coupling the lighting device to a lighting device support member and extending the lighting device support member from the side wall, wherein the positioning comprises positioning the lighting device at approximately the center of the reflector member, preventing rotation of the lighting device with the coupling of the lighting device to the lighting device support member, activating the lighting device, reflecting light from the lighting device from the reflector surface, and dissipating heat from the lighting device with the lighting device support member.

A lighting apparatus has been described that includes a chassis operable to house a lighting device, a door moveably coupled to the chassis, and a latch moveably coupled to the door, whereby the latch is operable to move into engagement with the chassis to secure the door to the chassis. In an exemplary embodiment, the door comprises a gasket that is operable to engage the chassis to provide a seal between the door and the chassis. In an exemplary embodiment, the gasket compresses against the chassis upon engagement with the chassis and prior to the latch becoming operable to move into engagement with the chassis. In an exemplary embodiment, the chassis comprises a latch engagement feature, whereby the latch is operable to move into engagement with the latch engagement feature to secure the door to the chassis. In an exemplary embodiment, the latch engagement feature defines a latch channel that is operable to couple the latch to the latch engagement feature. In an exemplary embodiment, the latch includes a distal end that is operable to become positioned in the latch channel upon the coupling of the latch with the latch engagement feature. In an exemplary embodiment, the door provides access to a lighting device housing defined by the chassis. In an exemplary embodiment, a latch actuator is located adjacent a first surface on the door and coupled to the latch, wherein the latch is located adjacent a second surface on the door and operable to be actuated into engagement with the chassis by the latch actuator. In an exemplary embodiment, the first surface is located opposite the second surface on the door. In an exemplary embodiment, the door is pivotally coupled to the chassis. In an exemplary embodiment, the latch is slideably coupled to the door.

A lighting apparatus has been described that includes means for housing a lighting device, a door moveably coupled to the means for housing a lighting device; and means for securing the door to the means for housing a lighting device free of the use of a tool. In an exemplary embodiment, the door comprises a means for providing a seal between the door and the means for housing a lighting device. In an exemplary embodiment, the means for providing a seal compresses against the means for housing a lighting device upon engagement with the means for housing a lighting device and prior to the means for securing the door becoming operable to secure the door to the means for housing a lighting device. In an exemplary embodiment, the means for housing a lighting device comprises a means for engaging the means for securing the door, whereby the means for securing the door is operable to move into engagement with the means for engaging the means for securing the door to secure the door to the means for housing a lighting device. In an exemplary embodiment, the means for engaging the means for securing the door defines a channel that is operable to couple the means for securing the door to the means for engaging the means for securing the door. In an exemplary embodiment, the means for securing the door includes a distal end that is operable to become positioned in the channel upon the coupling of the means for securing the door with the means for engaging the means for securing the door. In an exemplary embodiment, the door provides access to a lighting device housing defined by the means for housing a lighting device. In an exemplary embodiment, the apparatus further includes a means for actuating the means for securing the door located adjacent a first surface on the door and coupled to the means for securing the door, wherein the means for securing the door is located adjacent a second surface on the door and operable to be actuated into engagement with the means for housing a lighting device by the means for actuating the means for securing the door. In an exemplary embodiment, the first surface is located opposite the second surface on the door. In an exemplary embodiment, the door is pivotally coupled to the means for housing a lighting device. In an exemplary embodiment, the means for securing the door is slideably coupled to the door.

A method for securing a door to a lighting device chassis has been described that includes providing a lighting device chassis and a door moveably coupled to the lighting device chassis, and securing the door to the lighting device chassis without the use of a tool. In an exemplary embodiment, the method further includes providing a seal between the door and the lighting device chassis. In an exemplary embodiment, the providing the seal provides opposite forces on the door and the lighting device chassis to enhance the securing of the door to the chassis. In an exemplary embodiment, the securing comprises engaging a latch that is moveably coupled to the door with the lighting device chassis.

A lighting apparatus has been described that includes a chassis operable to house a lighting device and comprising a latch engagement feature, a door pivotally coupled to the chassis and operable to provide access to a lighting device housing defined by the chassis, a gasket that is coupled to the door and operable to engage the chassis to provide a seal between the door and the chassis, and a latch slideably coupled to the door, whereby the latch is operable to move into engagement with the latch engagement feature to secure the door to the chassis, whereby the gasket compresses against the chassis upon engagement with the chassis and prior to the latch becoming operable to move into engagement with the latch engagement feature.

A lighting apparatus has been described that includes means for housing a lighting device, a door pivotally coupled to the means for housing a lighting device and comprising a means for providing a seal between the door and the means for housing a lighting device, wherein the door provides access to a lighting device housing defined by the means for housing a lighting device, and means for securing the door to the means for housing a lighting device free of the use of a tool slideably coupled to the door, whereby the means for providing a seal compresses against the means for housing a lighting device upon engagement with the means for housing a lighting device and prior to the means for securing the door becoming operable to secure the door to the means for housing a lighting device. A method for securing a door to a lighting device chassis has been described that includes providing a lighting device chassis and a door moveably coupled to the lighting device chassis, securing the door to the lighting device chassis without the use of a tool, wherein the securing comprises engaging a latch that is moveably coupled to the door with the lighting device chassis, and providing a seal between the door and the lighting device chassis, wherein the providing the seal provides opposite forces on the door and the lighting device chassis to enhance the securing of the door to the chassis A lighting apparatus has been described that includes a door, a chassis coupling member extending along a length of the door, a coupling channel defined by the chassis coupling member, and a stop member extending from the chassis coupling member. In an exemplary embodiment, the door is operable to pivotally couple to a lighting device chassis. In an exemplary embodiment, the chassis coupling member comprises an arcuate distal end that defines the coupling channel. In an exemplary embodiment, the stop member extends from the chassis coupling member opposite the coupling channel. In an exemplary embodiment, the apparatus further includes a stop surface on the chassis coupling member located adjacent the coupling channel. In an exemplary embodiment, the apparatus further includes a lighting device chassis, whereby the door is operable to pivotally couple to and decouple from the lighting device chassis. In an exemplary embodiment, the lighting device chassis defines a door coupling channel. In an exemplary embodiment, the apparatus further includes a stop member located adjacent the door coupling channel. In an exemplary embodiment, the apparatus further includes a support beam located adjacent the door coupling channel and defining a door coupling channel entrance. In an exemplary embodiment, the door is operable to pivotally couple to and decouple from the lighting device chassis without the use of a tool. In an exemplary embodiment, the door is operable to pivotally couple to and decouple from the lighting device chassis without the use of a fastener. In an exemplary embodiment, the door is operable to pivotally couple to and decouple from the lighting device chassis by manipulating the door relative to the lighting device chassis A lighting apparatus has been described that includes a door, and means for coupling the door to a means for housing a lighting device. In an exemplary embodiment, the means for coupling the door to a means for housing a lighting device pivotally couples the door to a means for housing a lighting device. In an exemplary embodiment, the means for coupling the door to a means for housing a lighting device comprises a means for allowing the means for coupling the door to a means for housing a lighting device to enter a channel defined by a means for housing a lighting device. In an exemplary embodiment, the means for coupling the door to a means for housing a lighting device comprises a means for preventing the means for coupling the door to a means for housing a lighting device from exiting a channel defined by a means for housing a lighting device. In an exemplary embodiment, the apparatus further includes means for preventing pivoting of the door when the door is coupled to a means for housing a lighting device. In an exemplary embodiment, the apparatus further includes means for housing a lighting device, whereby the door is operable to pivotally couple to and decouple from the means for housing a lighting device. In an exemplary embodiment, the means for housing a lighting device defines a means for allowing the door to couple to the means for housing a lighting device. In an exemplary embodiment, the apparatus further includes means for preventing the door from exiting the means for allowing the door to couple to the means for housing alighting device. In an exemplary embodiment, the apparatus further includes means for supporting the door located adjacent the means for allowing the door to couple to the means for housing a lighting device. In an exemplary embodiment, the door is operable to pivotally couple to and decouple from the means for housing a lighting device without the use of a tool. In an exemplary embodiment, the door is operable to pivotally couple to and decouple from the means for housing a lighting device without the use of a fastener. In an exemplary embodiment, the door is operable to pivotally couple to and decouple from the means for housing a lighting device by manipulating the door relative to the means for housing a lighting device.

A method for coupling a door to a lighting device chassis has been described that includes providing a door comprising a chassis coupling member, positioning the chassis coupling member in a door coupling channel on a lighting device chassis, and pivotally coupling the door to the lighting device chassis. In an exemplary embodiment, the positioning comprises positioning a portion of the chassis in a channel defined by the chassis coupling member in order to allow the chassis coupling member to enter the door coupling channel. In an exemplary embodiment, the pivotally coupling comprises preventing the chassis coupling member from exiting the door coupling channel by engaging a first stop member on the chassis coupling member with a second stop member located adjacent the door coupling channel. In an exemplary embodiment, the pivotally coupling comprises coupling the door to the lighting device chassis without the use of a tool. In an exemplary embodiment, the pivotally coupling comprises coupling the door to the lighting device chassis without the use of a fastener. In an exemplary embodiment, the pivotally coupling comprises coupling the door to the lighting device chassis by manipulating the door relative to the lighting device chassis. In an exemplary embodiment, the method further includes removing the door from the lighting device chassis by manipulating the door relative to the lighting device chassis.

A lighting apparatus has been described that includes a door, a chassis coupling member extending along a length of the door comprising an arcuate distal end that defines a chassis coupling channel and a stop surface located adjacent the chassis coupling channel, a stop member extending from the chassis coupling member opposite the chassis coupling channel, a lighting device chassis defining a door coupling channel and comprising a stop member located adjacent the door coupling channel and a support beam located adjacent the door coupling channel that defines a door coupling channel entrance, whereby the door is operable to pivotally couple to and decouple from the lighting device chassis by manipulating the door relative to the lighting device chassis and without the use of a tool or a fastener.

A lighting apparatus has been described that includes a door, means for housing a lighting device that defines a means for allowing the door to couple to the means for housing a lighting device, means for preventing the door from exiting the means for allowing the door to couple to the means for housing a lighting device, means for supporting the door located adjacent the means for allowing the door to couple to the means for housing a lighting device, and means for pivotally coupling the door to the means for housing a lighting device comprising a means for allowing the means for coupling the door to the means for housing a lighting device to enter a channel defined by the means for housing a lighting device, a means for preventing the means for coupling the door to the means for housing a lighting device from exiting the channel defined by the means for housing a lighting device, and a means for prevent pivoting of the door when the door is coupled to the means for housing a lighting device, whereby the door is operable to pivotally couple to and decouple from the means for housing a lighting device by manipulating the door relative to the means for housing a lighting device and without the use of a tool or a fastener.

A method for coupling a door to a lighting device chassis has been described that includes providing a door comprising a chassis coupling member, positioning the chassis coupling member in a door coupling channel on a lighting device chassis by positioning a portion of the chassis in a channel defined by the chassis coupling member in order to allow the chassis coupling member to enter the door coupling channel, pivotally coupling the door to the lighting device chassis by manipulating the door relative to the lighting device chassis and without the use of a tool or fastener, preventing the chassis coupling member from exiting the door coupling channel by engaging a first stop member on the chassis coupling member with a second stop member located adjacent the door coupling channel, and removing the door from the lighting device chassis by manipulating the door relative to the lighting device chassis.

A lighting apparatus has been described that includes a gasket defining a first light passageway, and a lens mounting channel defined by the gasket, located adjacent a perimeter of the first light passageway, and comprising a first channel surface and a second channel surface. In an exemplary embodiment, the gasket, the first light passageway, and the lens mounting channel are rectangular in shape. In an exemplary embodiment, the gasket is operable to provide a seal between a door and a lighting device chassis. In an exemplary embodiment, the first channel surface is substantially perpendicular to the second channel surface. In an exemplary embodiment, the apparatus further includes a lens comprising a first lens surface and a second lens surface and positioned in the lens mounting channel and immediately adjacent the first light passageway. In an exemplary embodiment, the first lens surface engages the first channel surface and the second lens surface engages the second channel surface. In an exemplary embodiment, the engagement of the second lens surface and the second channel surface prevents light from escaping from the lens through second lens surface. In an exemplary embodiment, the apparatus further includes a door defining a second light passageway, whereby the gasket is coupled to the door adjacent the second light passageway. In an exemplary embodiment, the gasket is located about the perimeter of the second light passageway such that the first light passageway is located adjacent the second light passageway and the lens is located between the first light passageway and the second light passageway. In an exemplary embodiment, the gasket is operable to provide a seal between the door and a lighting device chassis.

A lighting apparatus has been described that includes means for providing a seal, and means for preventing light from escaping a means for directing light on the means for providing a seal. In an exemplary embodiment, the means for providing a seal and means for preventing light from escaping a lens are rectangular in shape. In an exemplary embodiment, the means for providing a seal is operable to provide a seal between a door and a means for housing a lighting device. In an exemplary embodiment, the apparatus further includes means for directing light coupled to the means for providing a seal and positioned in the means for preventing light from escaping a means for directing light on the means for providing a seal. In an exemplary embodiment, the means for directing light engages the means for preventing light from escaping a means for directing light on the means for providing a seal. In an exemplary embodiment, the engagement of means for directing light and the means for preventing light from escaping a means for directing light on the means for providing a seal prevents light from escaping from the means for directing light. In an exemplary embodiment, the apparatus further includes a door, whereby the means for providing a seal is coupled to the door. In an exemplary embodiment, the means for providing a seal is operable to provide a seal between the door and a means for housing a lighting device.

A method for coupling a lens to a lighting apparatus has been described that includes providing a gasket that defines a light passageway and a lens mounting channel about the perimeter of the light passageway, positioning a lens in the lens mounting channel and adjacent the light passageway, and coupling the gasket to a lighting apparatus. In an exemplary embodiment, the method further includes directing light through the lens, whereby the lens mounting channel prevents light from escaping from a perimeter surface of the lens. In an exemplary embodiment, the gasket is coupled to a door on the lighting apparatus. In an exemplary embodiment, the method further includes providing a seal between the door and a lighting apparatus chassis with the gasket.

A lighting apparatus has been described that includes a gasket defining a first light passageway, a lens mounting channel defined by the gasket, located adjacent a perimeter of the first light passageway, and comprising a first channel surface and a second channel surface, whereby the first channel surface is substantially perpendicular to the second channel surface, a lens comprising a first lens surface and a second lens surface and positioned in the lens mounting channel and immediately adjacent the first light passageway, wherein the first lens surface engages the first channel surface and the second lens surface engages the second channel surface, whereby the engagement of the second lens surface and the second channel surface prevents light from escaping from the lens through second lens surface, and a door defining a second light passageway, wherein the gasket is coupled to the door adjacent the second light passageway and located about the perimeter of the second light passageway such that the first light passageway is located adjacent the second light passageway and the lens is located between the first light passageway and the second light passageway, whereby the gasket is operable to provide a seal between the door and a lighting device chassis.

A lighting apparatus has been described that includes means for providing a seal, means for preventing light from escaping a means for directing light on the means for providing a seal, means for directing light coupled to the means for providing a seal and positioned in the means for preventing light from escaping a means for directing light on the means for providing a seal, wherein the means for directing light engages the means for preventing light from escaping a means for directing light on the means for providing a seal, whereby the engagement of means for directing light and the means for preventing light from escaping a means for directing light on the means for providing a seal prevents light from escaping from the means for directing light, and a door, whereby the means for providing a seal is coupled to the door, wherein the means for providing a seal is operable to provide a seal between the door and a means for housing a lighting device.

A method for coupling a lens to a lighting apparatus has been described that includes providing a gasket that defines a light passageway and a lens mounting channel about the perimeter of the light passageway, positioning a lens in the lens mounting channel and adjacent the light passageway, coupling the gasket to a door on a lighting apparatus, directing light through the lens, whereby the lens mounting channel prevents light from escaping from a perimeter surface of the lens, and providing a seal between the door and a lighting apparatus chassis with the gasket.

A lighting apparatus has been described that includes a reflector member, including a side wall, a first arcuate reflector surface extending from the side wall and comprising a first surface finish and a first reflector edge, and a second arcuate reflector surface extending from the side wall and comprising a second surface finish and a second reflector edge, whereby the second arcuate reflector surface is positioned adjacent the first arcuate reflector surface such that the second reflector edge is located in a spaced apart orientation from the first reflector edge. In an exemplary embodiment, the first arcuate reflector surface comprises an involute shape. In an exemplary embodiment, the first surface finish comprises a specular finish. In an exemplary embodiment, the specular finish comprises a Miro 4 finish. In an exemplary embodiment, the second arcuate reflector surface comprises a parabolic shape. In an exemplary embodiment, the second surface finish comprises a diffuse finish. In an exemplary embodiment, the diffuse finish comprises a Miro 5 finish. In an exemplary embodiment, the apparatus further includes a step wall coupling the first arcuate reflector surface to the second arcuate reflector surface. In an exemplary embodiment, the first reflector edge is substantially parallel to the second reflector edge. In an exemplary embodiment, the apparatus further includes a lighting device coupled to the reflector member and positioned adjacent the first arcuate reflector surface and the second arcuate reflector surface, wherein the lighting device comprises a spacing criteria of approximately 1.68 for angles between 90 and 270 degrees. In an exemplary embodiment, the apparatus further includes a lighting device coupled to the reflector member and positioned adjacent the first arcuate reflector surface and the second arcuate reflector surface, wherein the lighting device comprises a spacing criteria of approximately 1.62 for angles between 90 and 270 degrees.

A lighting apparatus has been described that includes means for reflecting light, including means for supporting a means for reflecting light, first arcuate means for reflecting light extending from the means for supporting a means for reflecting light, and second arcuate means for reflecting light extending from the means for supporting a means for reflecting light, whereby the second arcuate means for reflecting light is positioned adjacent the first arcuate means for reflecting light such that the second arcuate means for reflecting light is located in a spaced apart orientation from the first arcuate means for reflecting light. In an exemplary embodiment, the first arcuate means for reflecting light comprises an involute means for reflecting light. In an exemplary embodiment, the second arcuate means for reflecting light comprises a parabolic means for reflecting light. In an exemplary embodiment, the apparatus further includes means for coupling the first arcuate means for reflecting light to the second arcuate means for reflecting light in a spaced apart orientation. In an exemplary embodiment, the apparatus further includes means for providing a spacing criteria of approximately 1.68 for angles between 90 and 270 degrees when a means for providing light is activated in the means for reflecting light. In an exemplary embodiment, the apparatus further includes means for providing a spacing criteria of approximately 1.62 for angles between 90 and 270 degrees when a means for providing light is activated in the means for reflecting light.

A method for reflecting light has been described that includes providing a reflector member comprising a side wall, a first arcuate reflector surface extending from the side wall, and a second arcuate reflector surface extending from the side wall and in a spaced apart orientation from the first arucate reflector surface, positioning a lighting device adjacent the first arcuate reflector surface and the second arcuate reflector surface, activating the lighting device, and reflecting light from the lighting device from the first arcuate reflector surface and the second arcuate reflector surface. In an exemplary embodiment, the positioning comprises positioning the lighting device at approximately the center of the reflector member.

A lighting apparatus has been described that includes a reflector member, including a side wall, a first involute reflector surface extending from the side wall and comprising a specular surface finish and a first reflector edge, a second parabolic reflector surface extending from the side wall and comprising a diffuse surface finish and a second reflector edge, whereby the second arcuate reflector surface is positioned adjacent the first arcuate reflector surface such that the second reflector edge is located in a spaced apart orientation from the first reflector edge, and a step wall coupling the first arcuate reflector surface to the second arcuate reflector surface; wherein the first reflector edge is substantially parallel to the second reflector edge.

A lighting apparatus has been described that includes means for reflecting light, including means for supporting a means for reflecting light, first involute means for reflecting light extending from the means for supporting a means for reflecting light, second parabolic means for reflecting light extending from the means for supporting a means for reflecting light, whereby the second arcuate means for reflecting light is positioned adjacent the first arcuate means for reflecting light such that the second arcuate means for reflecting light is located in a spaced apart orientation from the first arcuate means for reflecting light, and means for coupling the first arcuate means for reflecting light to the second arcuate means for reflecting light in a spaced apart orientation.

A method for reflecting light has been described that includes providing a reflector member comprising a side wall, a first arcuate reflector surface extending from the side wall, and a second arcuate reflector surface extending from the side wall and in a spaced apart orientation from the first arucate reflector surface, positioning a lighting device adjacent the first arcuate reflector surface and the second arcuate reflector surface, wherein the positioning comprises positioning the lighting device at approximately the center of the reflector member, activating the lighting device, and reflecting light from the lighting device from the first arcuate reflector surface and the second arcuate reflector surface.

A lighting apparatus has been described that includes a lighting device chassis, a rotational coupling member extending from a side of the lighting device chassis, and a coupling member stop beam extending from a surface of the rotational coupling member. In an exemplary embodiment the rotational coupling member defines fastener coupler. In an exemplary embodiment, the rotational coupling member is conical in shape. In an exemplary embodiment, the coupling member stop beam extends along a length of the rotational coupling member. In an exemplary embodiment, the apparatus further includes a chassis support member comprising a support arm, a rotational coupling member passageway defined by the support arm, whereby the rotational coupling member is positioned in the rotational coupling member passageway, and a support arm stop beam extending from the support arm and into the rotational coupling member passageway. In an exemplary embodiment, the rotational coupling member passageway is conical in shape. In an exemplary embodiment, the support arm stop beam is operable to engage the coupling member stop beam to prevent rotation of the lighting device chassis relative in the rotational coupling member passageway beyond the support arm stop beam. In an exemplary embodiment, the apparatus further includes a fastener coupled to the rotational coupling member and the support arm. In an exemplary embodiment, the fastener is operable to engage a surface on the rotational coupling member with a surface on the support arm adjacent the rotational coupling member passageway to prevent rotation of the lighting device chassis relative to the support arm. In an exemplary embodiment, the support arm stop beam extends along a length of the support arm and into the rotational coupling member passageway.

A lighting apparatus has been described that includes means for housing a lighting device, means for rotatably coupling the means for housing a lighting device to a means for supporting a means for housing a lighting device, and first means for preventing rotation of the means for housing a lighting device relative to a means for supporting a means for housing a lighting device. In an exemplary embodiment, the means for rotatably coupling the means for housing a lighting device to a means for supporting a means for housing a lighting device comprises a means for coupling a fastener to the means for rotatably coupling the means for housing a lighting device to a means for supporting a means for housing a lighting device. In an exemplary embodiment, the apparatus further includes means for supporting the means for housing a lighting device, and second means for preventing rotation of the means for housing a lighting device relative to a means for supporting a means for housing a lighting device.

A method for preventing rotation of a lighting device chassis has been described that includes providing a lighting device chassis comprising a rotational coupling member and a coupling member stop beam extending from a surface of the rotational coupling member, positioning the rotational coupling member in a rotational coupling member passageway defined by a support arm, and preventing rotation of the lighting device chassis by engaging the coupling member stop beam with a support arm stop beam that extends into the rotational coupling member passageway. In an exemplary embodiment, the method further includes coupling a fastener to the rotational coupling member and the support arm. In an exemplary embodiment, the method further includes rotating the lighting device chassis relative to the support arm into a position. In an exemplary embodiment, the method further includes engaging a surface on the rotational coupling member with a surface on the support arm using the fastener.

A lighting apparatus has been described that includes a lighting device chassis, a conical rotational coupling member extending from a side of the lighting device chassis and defining a fastener coupler, a coupling member stop beam extending along a length of the rotational coupling member, a chassis support member comprising a support arm, a conical rotational coupling member passageway defined by the support arm, whereby the rotational coupling member is positioned in the rotational coupling member passageway, a support arm stop beam extending along a length of the support arm and into the rotational coupling member passageway, whereby the support arm stop beam is operable to engage the coupling member stop beam to prevent rotation of the lighting device chassis relative in the rotational coupling member passageway beyond the support arm stop beam, and a fastener coupled to the rotational coupling member and the support arm, whereby the fastener is operable to engage a surface on the rotational coupling member with a surface on the support arm adjacent the rotational coupling member passageway to prevent rotation of the lighting device chassis relative to the support arm.

A lighting apparatus has been described that includes means for housing a lighting device, means for rotatably coupling the means for housing a lighting device to a means for supporting a means for housing a lighting device, wherein the means for rotatably coupling the means for housing a lighting device to a means for supporting a means for housing a lighting device comprises a means for coupling a fastener to the means for rotatably coupling the means for housing a lighting device to a means for supporting a means for housing a lighting device, first means for preventing rotation of the means for housing a lighting device relative to a means for supporting a means for housing a lighting device, means for supporting the means for housing a lighting device, and second means for preventing rotation of the means for housing a lighting device relative to a means for supporting a means for housing a lighting device.

A method for preventing rotation of a lighting device chassis has been described that includes providing a lighting device chassis comprising a rotational coupling member and a coupling member stop beam extending from a surface of the rotational coupling member, positioning the rotational coupling member in a rotational coupling member passageway defined by a support arm, preventing rotation of the lighting device chassis by engaging the coupling member stop beam with a support arm stop beam that extends into the rotational coupling member passageway, coupling a fastener to the rotational coupling member and the support arm, rotating the lighting device chassis relative to the support arm into a position, and engaging a surface on the rotational coupling member with a surface on the support arm using the fastener.

A lighting apparatus has been described that includes a louver member, at least one first coupling member extending from the louver member, and at least one second coupling member that is operable to couple to the louver member and engage a lighting device chassis in order to couple the louver member to a lighting device chassis. In an exemplary embodiment, the louver member comprises a plurality of louvers extending between a first support beam and a second support beam, whereby the at least one first coupling member extends from a first support beam. In an exemplary embodiment, the first support beam defines a first chassis channel and the second support beam defines a second chassis channel. In an exemplary embodiment, the louver member defines at least one fastener coupler. In an exemplary embodiment, the apparatus further includes a fastener, whereby the fastener is operable to couple the second coupling member to the louver member by positioning the fastener in the second coupling member and the fastener coupler. In an exemplary embodiment, the at least one first coupling member comprises a clip defining a chassis edge channel. In an exemplary embodiment, a pair of first coupling members extend from a support beam on louver member and are oriented in a spaced apart relationship on the support beam. In an exemplary embodiment, a pair of second coupling member are operable to couple to the louver member and engage a lighting device chassis in order to couple the louver member to a lighting device chassis. In an exemplary embodiment, the apparatus further includes a lighting device chassis door comprising a first edge and a second edge, whereby the first coupling member engages the first edge and the second coupling member engages the second edge to couple the louver member to the lighting device chassis door. In an exemplary embodiment, the lighting device chassis door defines at least one first coupling member channel and at least one second coupling member channel. In an exemplary embodiment, the lighting device chassis door defines a pair of first coupling channels in a spaced apart orientation on the first edge, a second coupling member channel on the second edge, and a second coupling member channel on a third edge of the lighting device chassis door, the third edge located opposite the second edge. In an exemplary embodiment, the at least one first coupling member and the at least one second coupling member allow the louver member to be coupled to the lighting device chassis door without modification of the lighting device chassis door.

A lighting apparatus has been described that includes means for directing light, means for coupling the means for directing light to a means for housing a lighting device without modification of the means for housing a light device. In an exemplary embodiment, the means for directing light comprises means for coupling the means for coupling the means for directing light to a means for housing a lighting device to the means for directing light. In an exemplary embodiment, the means for coupling the means for directing light to a means for housing a lighting device comprises means for positioning the means for directing light in the means for coupling the means for directing light to a means for housing a lighting device. In an exemplary embodiment, the apparatus further includes means for allowing access to a means for housing a lighting device, whereby the means for directing light is coupled to the means for allowing access to a means for housing a lighting device by the means for coupling the means for directing light to a means for housing a lighting device. In an exemplary embodiment, the means for allowing access to a means for housing a lighting device comprises means for allowing the means for coupling the means for directing light to a means for housing a lighting device to be positioned in the means for allowing access to a means for housing a lighting device.

A method for coupling a louver member to a lighting device chassis has been described that includes providing a louver member comprising a first coupling member, engaging the first coupling member with a lighting device chassis door, engaging a second coupling member to the lighting device chassis door, and coupling the louver member to the lighting device chassis door by coupling the second coupling member to the louver member. In an exemplary embodiment, the coupling comprises coupling the louver member to the lighting device chassis door without modification of the lighting device chassis door. In an exemplary embodiment, the engaging the first coupling member with a lighting device chassis door comprises positioning the lighting device chassis door in a channel defined by the first coupling member. In an exemplary embodiment, the engaging a second coupling member to the lighting device chassis door comprises positioning the lighting device chassis door in a channel defined by the second coupling member.

A lighting apparatus has been described that includes a louver member comprising a plurality of louvers extending between a first support beam and a second support beam, the first support beam defining a first chassis channel and the second support beam defining a second chassis channel, at least one fastener coupler defined by the second support beam, a pair of first coupling members extending from the first support beam in a spaced apart orientation on the louver member, each first coupling member comprising a clip defining an edge channel, a pair of second coupling members that are coupled to the louver member by a fastener that engages the second coupling member and the fastener coupler, a lighting device chassis door comprising a first edge, a second edge, and a third edge located opposite the second edge, wherein the lighting device chassis door defines a pair of first coupling channels in a spaced apart orientation on the first edge, a second coupling member channel on the second edge, and a second coupling member channel on the third edge, whereby the first coupling members engage the first edge in the first coupling channels and the second coupling members engages the second edge and the third edge in the second coupling channels in order to couple the louver member to the lighting device chassis door without modification of the lighting device chassis door.

A lighting apparatus has been described that includes means for directing light, means for coupling the means for directing light to a means for housing a lighting device without modification of the means for housing a light device, wherein the means for coupling the means for directing light to a means for housing a lighting device comprises means for positioning the means for directing light in the means for coupling the means for directing light to a means for housing a lighting device, means for coupling the means for coupling the means for directing light to a means for housing a lighting device to the means for directing light, and means for allowing access to a means for housing a lighting device, whereby the means for directing light is coupled to the means for allowing access to a means for housing a lighting device by the means for coupling the means for directing light to a means for housing a lighting device, wherein the means for allowing access to a means for housing a lighting device comprises means for allowing the means for coupling the means for directing light to a means for housing a lighting device to be positioned in the means for allowing access to a means for housing a lighting device.

A method for coupling a louver member to a lighting device chassis has been described that includes providing a louver member comprising a first coupling member, engaging the first coupling member with a lighting device chassis door by positioning the lighting device chassis door in a channel defined by the first coupling member, engaging a second coupling member to the lighting device chassis door by positioning the lighting device chassis door in a channel defined by the second coupling member, and coupling the louver member to the lighting device chassis door by coupling the second coupling member to the louver member, whereby the coupling comprises coupling the louver member to the lighting device chassis door without modification of the lighting device chassis door.

It is understood that variations may be made in the foregoing without departing from the scope of the disclosure.

Any foregoing spatial references such as, for example, "upper," "lower," "above," "below," "rear," "between," "vertical," "angular," etc., are for the purpose of illustration only and do not limit the specific orientation or location of the structure described above.

In several exemplary embodiments, it is understood that one or more of the operational steps in each embodiment may be omitted. Moreover, in some instances, some features of the present disclosure may be employed without a corresponding use of the other features. Moreover, it is understood that one or more of the above-described embodiments and/or variations may be combined in whole or in part with any one or more of the other above-described embodiments and/or variations.

Although exemplary embodiments of this disclosure have been described in detail above, those skilled in the art will readily appreciate that many other modifications, changes and/or substitutions are possible in the exemplary embodiments without materially departing from the novel teachings and advantages of this disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A lighting apparatus, comprising:

a lighting device chassis including a rotational coupling member extending from a side of the lighting device chassis;

a chassis support member comprising a support arm;

the support arm further including a rotational coupling member passageway engaged with and surrounding the rotational coupling member so as to support the lighting device chassis and to provide the lighting device chassis with substantially 360 degrees of rotation relative to the rotational coupling member passageway;

a coupling member stop beam extending from a surface of the rotational coupling member; and a support arm stop beam extending within the rotational coupling member passageway, wherein the support arm stop beam engages the coupling member stop beam when the lighting device chassis is rotated, and wherein the support arm stop beam limits the lighting device chassis to substantially 360 degrees of rotation relative to the rotational coupling member passageway.

2. The apparatus of claim 1, wherein the rotational coupling member is conical in shape.

3. The apparatus of claim 1, wherein the coupling member stop beam extends along a length of the rotational coupling member.

4. The apparatus of claim 2, wherein the rotational coupling member passageway is conical in shape.

5. The apparatus of claim 1, further comprising:

a lighting device coupled to a second side of the lighting device chassis;

the second side of the lighting device including an aperture for engaging a power supply cable;

a power supply cable electrically coupled to the lighting device and engaged with the aperture;

whereby the support arm stop beam prevents the rotation of the lighting device chassis from binding the power cable.

6. The apparatus of claim 1, further comprising:

a fastener coupler included in the rotational coupling member; and a fastener coupled to the rotational coupling member and the support arm.

7. The apparatus of claim 6, wherein the fastener is operable to engage a surface on the rotational coupling member with a surface on the support arm adjacent the rotational coupling member passageway to prevent rotation of the lighting device chassis relative to the support arm.

8. The apparatus of claim 3, wherein the support arm stop beam extends along a length of the rotational coupling member passageway.

9. A method for preventing rotation of a lighting device chassis, comprising:

providing a lighting device chassis comprising a rotational coupling member and a coupling member stop beam extending from a surface of the rotational coupling member;

positioning the rotational coupling member in a rotational coupling member passageway included in a support arm, the rotational coupling member passageway engaging and surrounding the rotational coupling member so as to support the lighting device chassis and provide the lighting device chassis with substantially 360 degrees of rotation relative to the rotational coupling member passageway; and limiting rotation of the lighting device chassis to substantially 360 degrees by engaging the coupling member stop beam with a support arm stop beam extending within the rotational coupling member passageway.

10. The method of claim 9, further comprising:

coupling a fastener to the rotational coupling member and the support arm.

11. The method of claim 10, thither comprising:

rotating the lighting device chassis relative to the support arm into a position.

12. The method of claim 11, further comprising:

engaging a surface on the rotational coupling member with a surface on the support arm using the fastener.

13. A lighting apparatus, comprising:

a lighting device chassis;

a conical rotational coupling member extending from a side of the lighting device chassis and including a fastener coupler;

a coupling member stop beam extending from the rotational coupling member;

a chassis support member comprising a support arm;

a support arm including a conical rotational coupling member passageway engaged with and surrounding the rotational coupling member so as to support the lighting device chassis and to provide the lighting device chassis with substantially 360 degrees of rotation relative to the rotational coupling member passageway;

a support arm stop beam extending from the rotational coupling member passageway, wherein the support arm stop beam limits rotation of the lighting device chassis relative to the rotational coupling member passageway to substantially 360 degrees; and a fastener coupled to the rotational coupling member and the support arm, whereby the fastener is operable to engage a surface on the rotational coupling member with a surface on the support arm adjacent the rotational coupling member passageway to prevent rotation of the lighting device chassis relative to the support arm.

14. A method for preventing rotation of a lighting device chassis, comprising:

providing a lighting device chassis comprising a rotational coupling member and a coupling member stop beam extending from a surface of the rotational coupling member;

positioning the rotational coupling member in a rotational coupling member passageway included in a support arm, the rotational coupling member passageway surrounding and engaging the rotational coupling member so as to support the lighting device chassis with substantially 360 degrees of rotation relative to the rotational coupling member passageway;

limiting rotation of the lighting device chassis to substantially 360 derees by engaging the coupling member stop beam with a support arm stop beam extending within the rotational coupling member passageway;

coupling a fastener to the rotational coupling member and the support arm;

rotating the lighting device chassis relative to the support arm into a position; and engaging a surface on the rotational coupling member with a surface on the support arm using the fastener.

15. An apparatus for providing light, comprising:

a lighting device chassis, comprising:

a lighting device coupled to a first side of the lighting device chassis, the first side of the lighting device chassis including an aperture for engaging a power supply cord;

a power supply cable electrically coupled to the lighting device and engaged in the aperture;

a chassis support member for supporting the lighting device chassis, the chassis support member comprising a support arm, wherein the support arm includes a rotational coupling member passageway that engages and surrounds a rotational coupling member extending from the lighting device chassis, the rotational coupling member providing the lighting device chassis with substantially 360 degrees of rotation relative to the rotational coupling member passageway;

the rotational coupling member further comprising a coupling member stop beam;

the rotational coupling member passageway further comprising a support arm stop beam extending within the rotational coupling member passageway, such that the support arm stop beam engages the coupling member stop beam, limiting the lighting device chassis to substantially 360 degrees of rotation relative to the rotational coupling member passageway, whereby the coupling member stop beam engages the support arm stop beam to prevent the binding of the power supply cable.

16. The apparatus of claim 15, wherein the rotational coupling member and the rotational coupling member passageway are conical.

17. The apparatus of claim 15, further comprising a fastener operable to couple the rotational coupling member to a surface on the support arm to prevent rotation of the lighting device chassis relative to the support arm.

* * * * *